US012711776B2

(12) United States Patent
Richert et al.

(10) Patent No.: US 12,711,776 B2
(45) Date of Patent: Aug. 18, 2026

(54) SYSTEMS AND METHODS FOR CONSTRUCTING HIGH RESOLUTION PANORAMIC IMAGERY FOR FEATURE IDENTIFICATION ON ROBOTIC DEVICES

(71) Applicant: Brain Corporation, San Diego, CA (US)

(72) Inventors: Micah Richert, San Diego, CA (US); Guru-Koushik Senthil-Kumar, San Diego, CA (US)

(73) Assignee: Brain Corporation, San Diego, CA (US)

( * ) Notice: Subject to any disclaimer, the term of this patent is extended or adjusted under 35 U.S.C. 154(b) by 282 days.

(21) Appl. No.: 18/369,286

(22) Filed: Sep. 18, 2023

(65) Prior Publication Data

US 2024/0096103 A1 Mar. 21, 2024

Related U.S. Application Data

(60) Provisional application No. 63/407,283, filed on Sep. 16, 2022.

(51) Int. Cl.
*G06V 20/56* (2022.01)
*G06T 7/73* (2017.01)
(Continued)

(52) U.S. Cl.
CPC ................ *G06V 20/56* (2022.01); *G06T 7/73* (2017.01); *G06V 10/24* (2022.01); *G06V 10/56* (2022.01);
(Continued)

(58) Field of Classification Search
CPC ........ G06V 20/56; G06V 10/24; G06V 10/56; G06V 10/82; G06V 20/10; G06T 7/73;
(Continued)

(56) References Cited

U.S. PATENT DOCUMENTS 5,111,401 A 5/1992 Everett, Jr. et al.
5,696,675 A 12/1997 Nakamura et al.
(Continued)

FOREIGN PATENT DOCUMENTS

EP 1240562 B1 6/2004
EP 2343615 B1 10/2018
(Continued)

OTHER PUBLICATIONS

Basic Research Series: Optical Information Technology State-of-the-Art Report; Publication date 1993.
(Continued)

*Primary Examiner* — Charlotte M Baker
*Assistant Examiner* — Pardis Sohraby
(74) *Attorney, Agent, or Firm* — Sidharth Kapoor; Pierson Ferdinand LLP

(57) ABSTRACT

Systems and methods for constructing high resolution panoramic imagery for feature identification on robotic devices are disclosed herein. According to at least one non-limiting exemplary embodiment, a robot collects a plurality of images of an environment, these images include large overlap in their visual scenes. Using additional image data from the overlapping images, resolution of labels, price tags, and other inventory tags may be enhanced when constructing panoramic imagery to improve feature identification.

20 Claims, 17 Drawing Sheets

(51) Int. Cl.

| | |
|---|---|
| ***G06V 10/24*** | (2022.01) |
| ***G06V 10/56*** | (2022.01) |
| ***G06V 10/82*** | (2022.01) |

(52) U.S. Cl.
CPC .... *G06V 10/82* (2022.01); *G06T 2207/20084* (2013.01)

(58) Field of Classification Search
CPC . G06T 2207/20084; G06T 2207/20081; G06T 2207/30204; G06T 7/33; G06T 7/579
USPC .......................................................... 382/100
See application file for complete search history.

(56) References Cited

U.S. PATENT DOCUMENTS

| | | | |
|---|---|---|---|
| 5,758,298 | A | 5/1998 | Guldner |
| 5,793,900 | A | 8/1998 | Nourbakhsh et al. |
| 5,793,934 | A | 8/1998 | Bauer |
| 6,667,592 | B2 | 12/2003 | Jacobs et al. |
| 7,170,252 | B2 | 1/2007 | Maeki |
| 7,502,065 | B2 | 3/2009 | Nakahara |
| 7,965,890 | B2 | 6/2011 | Marcus et al. |
| 8,185,239 | B2 | 5/2012 | Teng et al. |
| 8,300,890 | B1 | 10/2012 | Gaikwad et al. |
| 8,542,875 | B2 | 9/2013 | Eswara |
| 8,903,589 | B2 | 12/2014 | Sofman et al. |
| 8,918,241 | B2 | 12/2014 | Chen et al. |
| 8,948,913 | B2 | 2/2015 | Choi et al. |
| 8,954,191 | B2 | 2/2015 | Yi et al. |
| 9,076,214 | B2 | 7/2015 | Tsutsumi |
| 9,122,948 | B1 | 9/2015 | Zhu et al. |
| 9,174,672 | B2 | 11/2015 | Zeng et al. |
| 9,192,869 | B2 | 11/2015 | Moriya |
| 9,208,384 | B2 | 12/2015 | Conwell et al. |
| 9,216,745 | B2 | 12/2015 | Beardsley et al. |
| 9,233,472 | B2 | 1/2016 | Angle et al. |
| 9,286,810 | B2 | 3/2016 | Eade et al. |
| 9,304,001 | B2 | 4/2016 | Park et al. |
| 9,380,922 | B2 | 7/2016 | Duffley et al. |
| 9,400,501 | B2 | 7/2016 | Schnittman |
| 9,404,756 | B2 | 8/2016 | Fong et al. |
| 9,519,289 | B2 | 12/2016 | Munich et al. |
| 9,534,899 | B2 | 1/2017 | Gutmann et al. |
| 9,538,892 | B2 | 1/2017 | Fong et al. |
| 9,864,377 | B2 | 1/2018 | Welty et al. |
| 9,910,444 | B2 | 3/2018 | Eade et al. |
| 9,952,053 | B2 | 4/2018 | Fong et al. |
| 10,093,021 | B2 | 10/2018 | Aghamohammadi et al. |
| 10,209,063 | B2 | 2/2019 | Anderson-Sprecher |
| 10,383,497 | B2 | 8/2019 | Han et al. |
| 10,667,664 | B2 | 6/2020 | Sheikh et al. |
| 11,182,589 | B2 * | 11/2021 | Xu ........................... G06T 7/70 |
| 11,927,965 | B2 | 3/2024 | Ebrahimi Afrouzi et al. |
| 12,524,734 | B2 * | 1/2026 | Skaff .................... G06Q 10/087 |
| 2004/0117079 | A1 | 6/2004 | Hulden |
| 2006/0188168 | A1 | 8/2006 | Sheraizin et al. |
| 2008/0059015 | A1 | 3/2008 | Whittaker et al. |
| 2008/0294338 | A1 | 11/2008 | Doh et al. |
| 2012/0121161 | A1 | 5/2012 | Eade et al. |
| 2015/0261223 | A1 | 9/2015 | Fong et al. |
| 2015/0324662 | A1 * | 11/2015 | Garg ......................... G06T 7/90 382/165 |
| 2019/0355140 | A1 * | 11/2019 | Ueno ...................... G06T 7/593 |
| 2021/0354302 | A1 * | 11/2021 | Bathala ................... G06T 7/248 |
| 2021/0385378 | A1 * | 12/2021 | Cier ..................... H04N 5/2624 |

FOREIGN PATENT DOCUMENTS

| | | | |
|---|---|---|---|
| JP | 3265212 | B2 | 3/2002 |
| JP | 2009216600 | A | 9/2009 |
| JP | 2009288930 | A | 12/2009 |
| JP | 5769455 | B2 | 8/2015 |
| KR | 10-2010-0027683 | A | 3/2010 |
| KR | 101048098 | B1 | 7/2011 |
| WO | 2011146259 | A2 | 11/2011 |

OTHER PUBLICATIONS

Bernard Feverjon et al., A local based approach for path planning of manipulators with a high number of degrees of freedom. Proceedings. 1987 IEEE International Conference on Robotics and Automation 4 (1987): 1152-1159.

Brett R. Fajen et al., A Dynamical Model of Visually-Guided Steering, Obstacle Avoidance, and Route Selection. International Journal of Computer Vision 54 (2003): 13-34.

Christoph Rosmann et al., Efficient Trajectory Optimization Using a Spares Model. 2013 Eur. Conf. on Mobile Robots; Sep. 2013.

Dave Ferguson et al., Planning Long Dynamically Feasible Maneuvers for Autonomous Vehicles, Int'l J. of Robotics Research, vol. 28(8); Jun. 26, 2009.

David G. Lowe, Object Recognition from Local Scale-Invariant Features; 1999.

Dieter Fox et al., The Dynamic Window Approach to Collision Avoidance, IEEE Robotics and Automation Magazine, vol. 4(1); Apr. 1997.

Francisco Amoros et al., Global Appearance Applied to Visual Map Building and Path Estimation Using Multiscale Analysis, Hindawi Publishing Corporation, Mathematical Problems in Engineering, vol. 2014 Article ID 365417; Jul. 22, 2014.

Gany Berkovic and Ehud Shafir, Optical Methods for Distance and Displacement Measurements; Sep. 11, 2012.

Handbook of Optical Systems, vol. 4: Survey of Optical Instruments; 2008.

Hani Safadi, Local Path Planning Using Virtual Potential Field, McGill University School of Computer Science; Apr. 18, 2007.

J.M. Rueger, Electronic Distance Measurement, 3rd Ed.; 1990.

J.M. Rueger, Electronic Distance Measurement, 4th Ed.; 1996.

Kazushi Nakazawa et al., Movement Control of Accompanying Robot Based on Artificial Potential Field Adapted to Dynamic Environments, Elec. Engin. in Japan, vol. 192; Feb. 2014.

Khalid Yousif et al., An Overview to Visual Odometry and Visual SLAM: Applications to Mobile Robotics, Intell. Ind. Syst. Vol. 1, 289; Nov. 13, 2015.

Laurent Itti, Christof Koch, and Ernst Niebur, A Model of Saliency-Based Visual Attention for Rapid Scene Analysis; Nov. 1998.

Lina J. Karam, Nabil G. Sadaka, Rony Ferzli, and Zoran A. Ivanovski, An Efficient Selective Perceptual-Based Super-Resolution Estimator; Dec. 2011.

Lu and Milios, Globally Consistent Range Scan Alignment for Environment Mapping, Autonomous robots, 4 Autonomous robots 333-49 (1997).

Lu Yin et al., A New Potential Field Method for Mobile Robot Path Planning in the Dynamic Environments, Asian J. of Conti•ol vol. 11(2); Mar. 2009.

Matthias Nieuwenhuisen et al., Predictive Potential Field-Based Collision Avoidance for Multicopters, Remote Sensing and Spatial Information Sciences, vol. XL-1; Sep. 4, 2013.

Mejdl Safran and Steven Haar, Arduino and Android Powered Object Tracking Robot; Nov. 27, 2012.

Oscar Montiel et al., Optimal Path Planning Generation for Mobile Robots Using Parallel Evolutionary Artificial Potential Field, J. Intell. Robot Sys.; Sep. 20, 2014.

Oussama Khatib, Real-Time Obstacle Avoidance for Manipulators and Mobile Robots Int'l J. of Robotics Research, vol. 5(1); 1986.

P. Payeur, Improving Robot Path Planning Efficiency with Probabilistic Virtual Environment Models. IEEE Int'l Conf. on Virtual Environments; Jul. 2004.

Peter Biber and Wolfgang StraBer, nScan-Matching: Simultaneous Matching of Multiple Scans and Application to SLAM, Proceedings 2006 IEEE International Conference on Robotics and Automation, 2006.

Pierre Melchior et al., Robust Path Planning for Mobile Robot Based on Fractional Attractive Force. 2009 American Control Conf.; Jun. 2009.

(56) References Cited

OTHER PUBLICATIONS

Qian Jia & Xingsong Wang, An Improved Potential Field Method for Path Planning, 2010 Chinese Control and Decision Conference; 2010.
Qian Xu, Chaitali Chakrabarti, and Lina J. Karam, A Distributed Canny Edge Detector and its Implementation on FGPA; 2011.
Richard Szeliski, Image Alignment and Stitching: A Tutorial, Foundations and Trends in Computer vol. 2; 2006.
Sean Quinlan & Oussama Khatib, Elastic Bands: Connecting Path Planning and Control, IEEE Int'l Conference on Robotics and Automation; 1998.
Srenivas Varadarajan and Lina J. Karam, An Improved Perception-Based No-Reference Objective Image Sharpness Metric Using Iterative Edge Refinement; 2008.
Srenivas Varadarajan, Chaitali Chakrabarti, Lina J. Karam, and Judit Maitinez Bauza, A Distributed Psycho-Visually Motivated Canny Edge Detector; 2010.
Srenivas Varadarajan, Lina J. Karam, and Dinei Florencio, Background Recovery from Video Sequences Using Motion Parameters; 2009.
Stachniss et al., Springer Handbook of Robotics, Chapter 46: Simultaneous Localization and Mapping, Springer (2d ed.); Jan. 1, 2016.
Prassler et al., Springer Handbook of Robotics, Chapter 65: Domestic Robots, Springer (2d ed.); Jan. 1, 2016.
Suzuki and Abe, Topological Structural Analysis of Digitized Binary Images by Border Following; 1983.
Wang Tianmiao et al., Mobile Robot Control Based on Dynamic Potential, Chinese J. of Sys. Engin. & Elec. Vol. 3; Mar. 31, 1992.
Ya-Chun Chang & Yoshio Yamamoto, Path Planning of Wheeled Mobile Robot with Simultaneous Free Space Locating Capability, Int'l Serv. Robotics; Nov. 25, 2008.
Yong K. Hwang & Narenda Ahuja, A Potential Field Approach to Path Planning, IEEE Transactions on Robotics and Automation vol. 8(1); Feb. 1992.
Wolfgang Hess et al., Real-time loop closure in 2D LIDAR SLAM, 2016 IEEE International Conference on Robotics and Automation; May 16-21, 2016.
Zhenyu Wu et al., Collision Avoidance for Mobile Robots Based on Artificial Potential Field and Obstacle Envelope Modelling, Assembly Automation, vol. 36(3); Aug. 1, 2016.
Kaiqi Huang, Liangsheng Wang, Tieniu Tan, and Steve Maybank, A Real-Time Object Detecting and Tracking System for Outdoor Night Surveillance; 2008.
Subramanian Saravankumar et al., Multipoint potential field method for path planning of autonomous underwater vehicles in 3D space, Intel Serv Robots 2013; Oct. 6, 2013.
Javier Minguez et al., Abstracting Vehicle Shape and Kinematic Constraints from Obstacle Avoidance Methods, Autonomous Robots, vol. 20(1); Feb. 3, 2006.
Alan Conrad Bovik, Marianna Clark, Wilson S. Geisler, Multichannel Texture Analysis Using Localized Spatial Filters; Jan. 1990.
John Canny, A Computational Approach to Edge Detection, IEEE Transactions on Pattern Analysis and Machine Intelligence, vol. PAMI- 8, No. 6; Nov. 1986.
Edwin B. Olson, Robust and Efficient Robotic Mapping, Massachusetts Institute of Technology; 2008.
Giorgio Grisetti, et al, Nonlinear Constraint Network Optimization for Efficient Map Learning, 10 IEEE Transactions on Intelligent Transportation Systems 428; Sep. 2009.
Edwin Olson, et al, Fast Iterative Alignment of Pose Graphs with Poor Initial Estimates, Proceedings of the 2006 IEE Conference on Robotics and Automation; May 2006.
John Folkesson and Henrik I. Christensen, Closing the Loop with Graphical SLAM 23 IEEE Transactions on Robotics 731; Aug. 2007.
Carlos Estrada, et al, Hierarchical SLAM: Real-Time Accurate Mapping of Large Environments, 21 IEEE Transactions on Robotics 588; Aug. 2005.
Tim Bailey and Hugh Durrant-Whyte, Simultaneous Localization and Mapping (SLAM): Part II, IEEE Robotics & Optimization Magazine; Sep. 2006.
Seongsoo Lee and Sukhan Lee, Embedded visual SLAM: Applications for low-cost consumer robots, 20 IEEE Robotics & Automation Magazine 83; 2013.
J.A. Castellanos, J. Montiel, J. Neira, J.D Tardos, The SPmap: A probabilistic framework for simultaneous localization and map building, 15(5) IEEE Trans. Robotics and Automation 948-952; 1999.
J. Scholz, S. Chitta, B. Marthi, M. Likhachev, Cart Pushing with a Mobile Manipulation System: Towards Navigation with Moveable Objects, IEEE International Conference on Robotics and Automation 6115-6120; 2011.
Neato XV-11.
Neato XV Signature Pro.
IRobot Roomba 880.
Karcher RoboCleaner RC3000.
The Dottie.
Orazio.
IRobot Scooba.
Kiva Systems (n/k/a Amazon Robotics).
Locus Robotics.
Google Self-Driving Car Project (n/k/a Waymo).
BMW M235i.
Avidbots ARS-2.
Avidbots Neo.
Internet Archives, WayBackMachine; http://www.neatorobotics.com/buy.html; Catured date: Jan. 23, 2010.
How Waterloo became a world-class robotics hub—The Globe and Mail; https://www.theglobeandmail.com/report-on-business/rob-magazine/how-waterloo-became-a-world-class-robotics-hub/article29784283/; Accessed Mar. 15, 2025.
News Release, iRobot Enters the Smart Home with Roomba® 980 Vacuum Cleaning Robot, Date: Sep. 16, 2015.
News Release, iRobot Expands Connected Product Line with Roomba@ 960; Date: Aug. 4, 2016.
E. Eade, P. Fong and M. E. Munich, "Monocular graph SLAM with complexity reduction," 2010 IEEE/RSJ International Conference on Intelligent Robots and Systems, Taipei, Taiwan, 2010, pp. 3017-3024.
Internet Archives, WayBackMachine; http://www.neatorobotics.com/faq.html; captured Jan. 24, 2010.
Neato XV-11 Robotic All-Floor Vacuum System; 2009.
Neato XV-11™ Vacuum User's Guide; Jan. 30, 2010.
Chang, Ya-Chun and Yoshio Yamamoto. "On-line path planning strategy integrated with collision and dead-lock avoidance schemes for wheeled mobile robot in indoor environments." Ind. Robot 35 (2008): 421-434.
Internet Archives, WayBackMachine; http://www.robotreviews.com/reviews/review-of-the-neato-xv-11-the-roomba-killer; Catured date: Sep. 23, 2010.

* cited by examiner

FIG. 6B(ii)

FIG. 6B(iii)

SYSTEMS AND METHODS FOR CONSTRUCTING HIGH RESOLUTION PANORAMIC IMAGERY FOR FEATURE IDENTIFICATION ON ROBOTIC DEVICES

PRIORITY

This application claims priority to U.S. provisional patent application No. 63/407,283 filed Sep. 16, 2022 under 35 U.S.C. § 119, the entire disclosure of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for constructing high resolution panoramic imagery for feature identification on robotic devices.

SUMMARY

The foregoing needs are satisfied by the present disclosure, which provides for, inter alia, systems and methods for constructing high resolution panoramic imagery for feature identification on robotic devices.

Exemplary embodiments described herein have innovative features, no single one of which is indispensable or solely responsible for their desirable attributes. Without limiting the scope of the claims, some of the advantageous features will now be summarized. One skilled in the art would appreciate that as used herein, the term robot may generally be referred to autonomous vehicle or object that travels a route, executes a task, or otherwise moves automatically upon executing or processing computer readable instructions.

According to at least one non-limiting exemplary embodiment, a robotic system is disclosed. The robotic system, comprises a memory comprising computer readable instructions stored thereon; and a processor configured to execute the computer readable instructions to: receive, via a sensor coupled to the robotic system, a first image of an object and a second image of the object as the robotic system moves along a route; determine, via a computer readable map, the distance to the object within the first and second images and translation of the robotic system between the first and second image; align the first and second images to form a panoramic image; and communicate the panoramic image to a server.

According to at least one non-limiting exemplary embodiment, the object comprises a plurality of labels, wherein each of the plurality of labels correspond to a feature of the object, the plurality of labels comprise at least one of a text or computer readable code element.

According to at least one non-limiting exemplary embodiment, the processor is further configured to execute the computer readable instructions to: determine a bounding box for each label depicted in the first and second images; and perform the alignment at least in part based on the locations of the bounding boxes.

According to at least one non-limiting exemplary embodiment, the processor is further configured to execute the computer readable instructions to determine an image quality matrix based on the level of contrast detected within bounding boxes of labels within a plurality of images.

According to at least one non-limiting exemplary embodiment, the processor is further configured to execute the computer readable instructions to adjust color values of pixels depicting the label within the bounding box of either the first image or the second image based on the color values of the label in the first and second images and the image quality matrix.

According to at least one non-limiting exemplary embodiment, the computer readable map includes annotations for the object to be scanned, and the panoramic image begins and ends proximate to the edges of the object on the computer readable map.

According to at least one non-limiting exemplary embodiment, a non-transitory computer readable medium comprising computer readable instructions stored is disclosed. The instructions, when executed by at least one processor configure of a robotic system, cause the at least one processor to receive, via a sensor coupled to the robotic system, a first image of an object and a second image of the object as the robotic system moves along a route; determine, via a computer readable map, the distance to the object within the first and second images and translation of the robotic system between the first and second image; align the first and second images to form a panoramic image; and communicate the panoramic image to a server.

According to at least one non-limiting exemplary embodiment, a method for forming an image by a robotic system is disclosed. The method, comprises at least one processor of the robot receiving, via a sensor coupled to the robotic system, a first image of an object and a second image of the object as the robotic system moves along a route; determining, via a computer readable map, the distance to the object within the first and second images and translation of the robotic system between the first and second image; aligning the first and second images to form a panoramic image; and communicating the panoramic image to a server.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
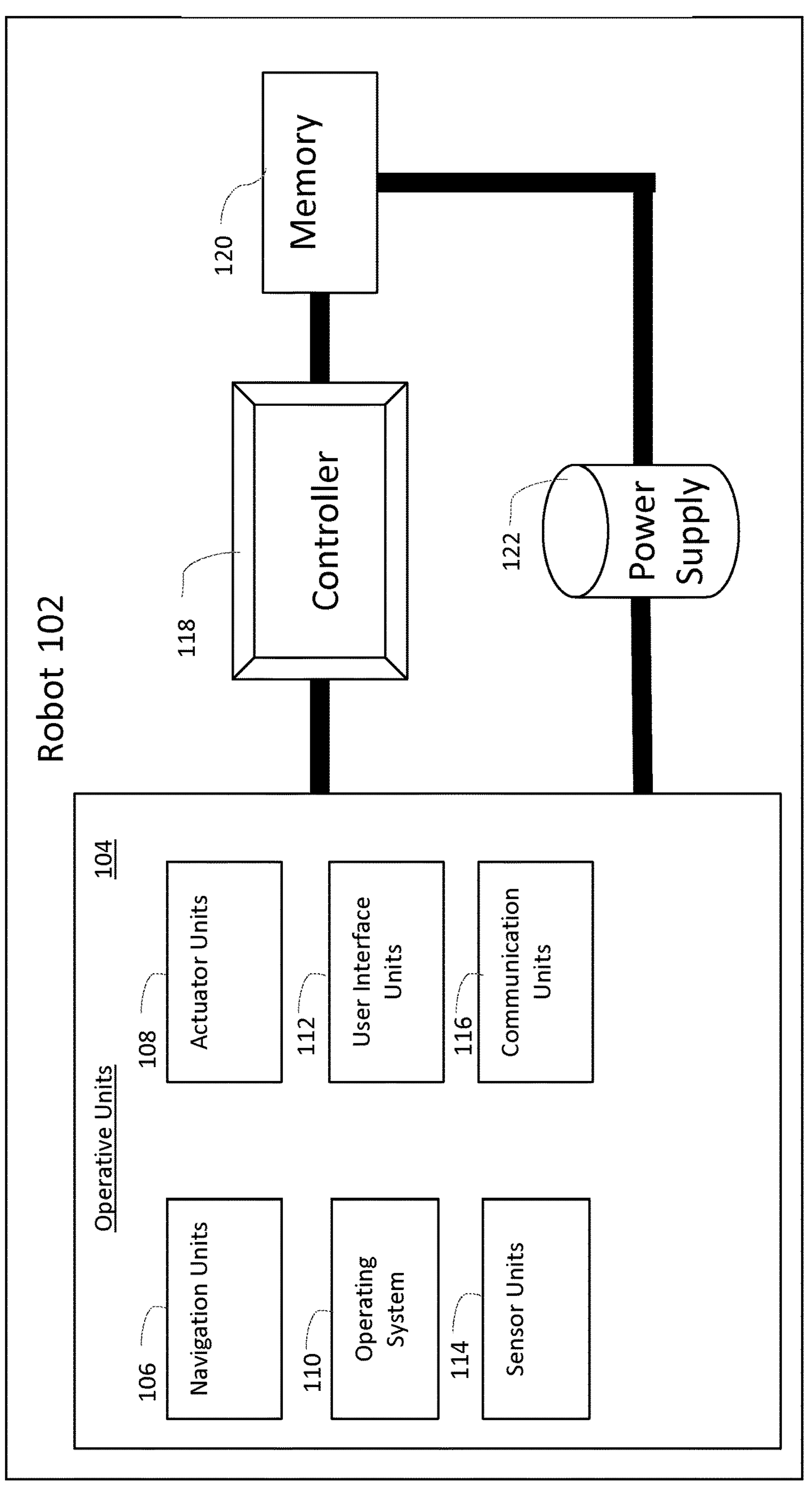
FIG. 1A is a functional block diagram of a robot in accordance with some embodiments of this disclosure.

All Figures disclosed herein are © Copyright 2022 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

Currently, identifying features within imagery is a complex task. Contemporary methods involving identifying features/objects by their appearance are computationally taxing and are often unreliable due to a large amount of training data required to ensure accurate predictions. Preferably, if an object is proximate to a label which identifies the object, the label would be the most accurate feature to use to identify the object. Often, however, labels such as price tags or inventory tags are small and difficult to image on large scales reliably. Accordingly, the systems and methods disclosed herein improve the legibility and resolution of labels by combining a plurality of redundant images of the labels.

Further, robots that scan for features within an environment may often capture images with large overlap. Processing every individual image, as previously mentioned, is computationally taxing but additionally obfuscates the true nature of the environment. For instance, 10 images of a cereal box may result in 10 cereal box detections, despite only one cereal box being present in the environment. Panoramic imagery resolves this redundancy issue in addition to reducing the number of identifications performed on, e.g., the cereal box. Construction of accurate panoramic imagery, however, is a complex challenge. Contemporary image-element stitching methods are considered which compare similar pixels in one image to another image in order to align the two images; however, these methods often fail in stitching together similar images with repeated features (e.g., a shelf with only one product displayed for the length of the shelf), feature-poor visual scenes (e.g., empty shelves), and may obfuscate smaller features (e.g., product label text) with interpolations. Accordingly, the systems and methods herein leverage robots to resolve many inaccuracies in contemporary image stitching and panoramic construction.

The present disclosure provides for systems and methods for constructing high resolution panoramic imagery for feature identification on robotic devices. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAY®, vehicles, etc.), trailer movers, vehicles, and the like. Robots may also include any autonomous and/or semi-autonomous machine for transporting items, people, animals, cargo, freight, objects, luggage, and/or anything desirable from one location to another.

As used herein, a feature may comprise one or more numeric values (e.g., floating point, decimal, a tensor of values, etc.) characterizing an input from a sensor unit 114 including, but not limited to, detection of an object, the object itself, portions of the object, parameters of the object (e.g., size, shape color, orientation, edges, etc.), an image as a whole, portions of the image (e.g., a hand of a painting of a human), color values of pixels of an image, depth values of pixels of a depth image, brightness of an image, changes of features over time (e.g., velocity, trajectory, etc. of an object), sounds, spectral energy of a spectrum bandwidth, motor feedback (i.e., encoder values), sensor values (e.g., gyroscope, accelerometer, GPS, magnetometer, etc. readings), a binary categorical variable, an enumerated type, a character/string, or any other characteristic of a sensory input. For example, a bottle of soap on a shelf may be a feature of the shelf, wherein a yellow price tag may be a feature of the bottle of soap and the shelf may be a feature of a store environment. The amount of soap bottles sold may be a feature of the sales environment.

As used herein, feature scanning or scanning for features or sensing features comprises a process of capturing images, LiDAR scans, temperature measures, spectral intensity measures, or other sensory data of features of an environment for the purpose of identifying the features using the sensory data. The act of feature scanning is different from the process of feature identification which, as used herein, involves detecting and/or identifying features within data collected by one or more sensors.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, 4G, or 5G including LTE/LTE-A/TD-LTE/TD-LTE, GSM, etc. variants thereof), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processor such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C #, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) reduce data egress from a robot, saving communications bandwidth and cost, (ii) reduce computations required to identify features in scan data from a robot, and (iii) improve the accuracy of the feature identification by enhancing depictions of labels corresponding to features to be identified. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors or processing devices (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors and application-specific integrated circuits ("ASICs"). Peripherals may include hardware accelerators configured to perform a specific function using hardware elements such as, without limitation, encryption/description hardware, algebraic processors (e.g., tensor processing units, quadradic problem solvers, multipliers, etc.), data compressors, encoders, arithmetic logic units ("ALU"), and the like. Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide computer-readable instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the computer-readable instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be internal to or on board robot 102 and/or may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 may include at least navigation units 106, actuator units 108, user interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find its position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; and/or repose cameras and sensors. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating and, in some cases actuating task units to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("ToF") cameras, structured light cameras, etc.), antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3.5G, 3.75G, 3GPP/3GPP2/HSPA+), 4G (4GPP/4GPP2/LTE/LTE-TDD/LTE-FDD), 5G (5GPP/5GPP2), or 5G LTE (long-term evolution, and variants thereof including LTE-A, LTE-U, LTE-A Pro, etc.), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processor, or robot performing a task, operation or transformation illustrated in the figures below comprises a controller executing computer readable instructions stored on a non-transitory computer readable storage apparatus, such as memory 120, as would be appreciated by one skilled in the art.

Figure 1B:
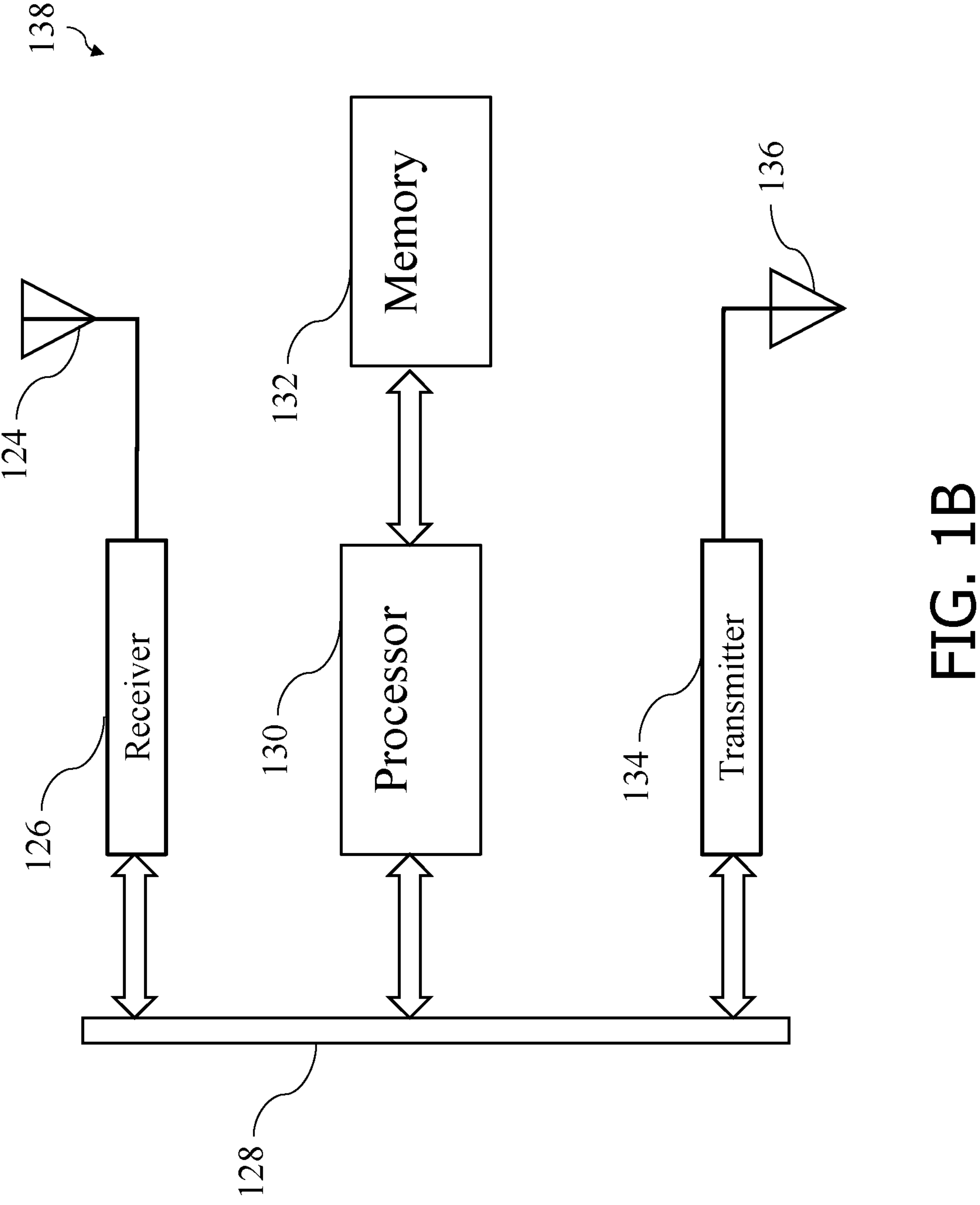
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may also illustrate an external server architecture configurable to effectuate the control of a robotic apparatus from a remote location, such as server 202 illustrated next in FIG. 2. That is, the server may also include a data bus, a receiver, a transmitter, a processor, and a memory that stores specialized computer readable instructions thereon.

One of ordinary skill in the art would appreciate that a controller 118 of a robot 102 may include one or more processing devices 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer readable instructions to perform a function may include one or more processing devices 138 thereof executing computer readable instructions and, in some instances, the use of any hardware peripherals known within the art. Controller 118 may be illustrative of various processing devices 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 138 for performing high level tasks (e.g., planning a route to avoid obstacles) and processing devices 138 for performing low-level tasks (e.g., producing actuator signals in accordance with the route).

Figure 2:
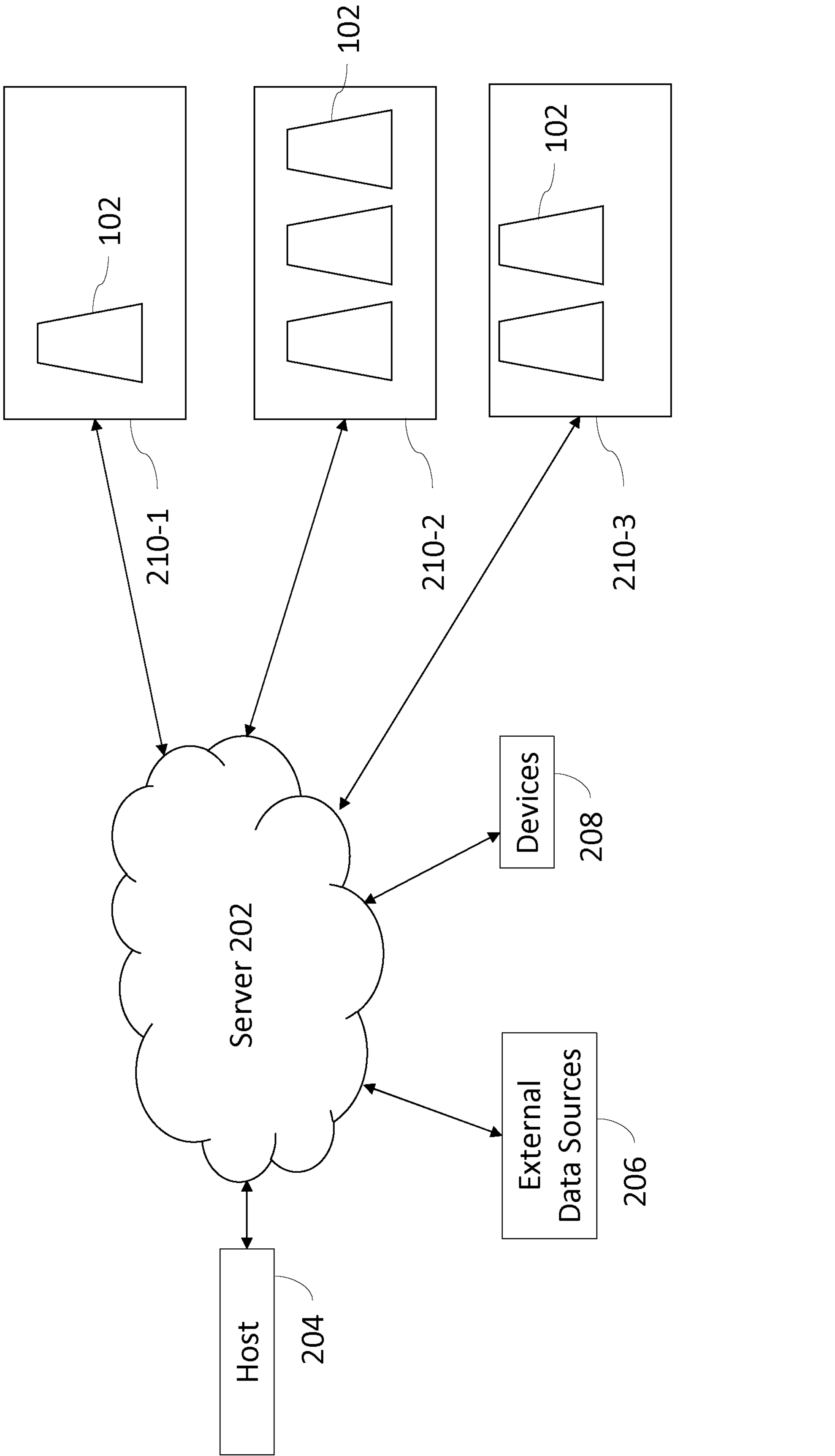
FIG. 2 is a functional block diagram of a server coupled to a plurality of robots, robot networks, and other devices in accordance with some embodiments of this disclosure.

FIG. 2 illustrates a server 202 and communicatively coupled components thereof in accordance with some exemplary embodiments of this disclosure. The server 202 may comprise one or more processing units depicted in FIG. 1B above, each processing unit comprising at least one processor 130 and memory 132 therein in addition to, without limitation, any other components illustrated in FIG. 1B. The processing units may be centralized at a location or distributed among a plurality of devices (e.g., a cloud server or dedicated server). Communication links between the server 202 and coupled devices may comprise wireless and/or wired communications, wherein the server 202 may further comprise one or more coupled antenna to effectuate the wireless communication. The server 202 may be coupled to a host 204, wherein the host 204 may correspond to a high-level entity (e.g., an admin) of the server 202. The host 204 may, for example, upload software and/or firmware updates for the server 202 and/or coupled devices 208 and 210, connect or disconnect devices 208 and 210 to the server 202, or otherwise control operations of the server 202. External data sources 206 may comprise any publicly available data sources (e.g., public databases such as weather data from the national oceanic and atmospheric administration (NOAA), satellite topology data, public records, etc.) and/or any other databases (e.g., private databases with paid or restricted access) of which the server 202 may access data therein. Devices 208 may comprise any device configured to perform a task at an edge of the server 202. These devices may include, without limitation, internet of things (IoT) devices (e.g., stationary CCTV cameras, smart locks, smart thermostats, etc.), external processors (e.g., external CPUs or GPUs), and/or external memories configured to receive and execute a sequence of computer readable instructions, which may be provided at least in part by the server 202, and/or store large amounts of data.

Lastly, the server 202 may be coupled to a plurality of robot networks 210, each robot network 210 comprising a local network of at least one robot 102. Each separate network 210 may comprise one or more robots 102 operating within separate environments from each other. An environment may comprise, for example, a section of a building (e.g., a floor or room) or any space in which the robots 102 operate. Each robot network 210 may comprise a different number of robots 102 and/or may comprise different types of robot 102. For example, network 210-2 may comprise a scrubber robot 102, vacuum robot 102, and a gripper arm robot 102, whereas network 210-1 may only comprise a robotic wheelchair, wherein network 210-2 may operate within a retail store while network 210-1 may operate in a home of an owner of the robotic wheelchair or a hospital. Each robot network 210 may communicate data including, but not limited to, sensor data (e.g., RGB images captured, LiDAR scan points, network signal strength data from sensors 202, etc.), IMU data, navigation and route data (e.g., which routes were navigated), localization data of objects within each respective environment, and metadata associated with the sensor, IMU, navigation, and localization data. Each robot 102 within each network 210 may receive communication from the server 202 including, but not limited to, a command to navigate to a specified area, a command to perform a specified task, a request to collect a specified set of data, a sequence of computer readable instructions to be executed on respective controllers 118 of the robots 102, software updates, and/or firmware updates. One skilled in the art may appreciate that a server 202 may be further coupled to additional relays and/or routers to effectuate communication between the host 204, external data sources 206, edge devices 208, and robot networks 210 which have been omitted for clarity. It is further appreciated that a server 202 may not exist as a single hardware entity, rather may be illustrative of a distributed network of non-transitory memories and processors.

According to at least one non-limiting exemplary embodiment, each robot network 210 may comprise additional processing units as depicted in FIG. 1B above and act as a relay between individual robots 102 within each robot network 210 and the server 202. For example, each robot network 210 may represent a plurality of robots 102 coupled to a single Wi-Fi signal, wherein the robot network 210 may comprise in part a router or relay configurable to communicate data to and from the individual robots 102 and server 202. That is, each individual robot 102 is not limited to being directly coupled to the server 202 and devices 206, 208.

One skilled in the art may appreciate that any determination or calculation described herein may comprise one or more processors of the server 202, edge devices 208, and/or robots 102 of networks 210 performing the determination or calculation by executing computer readable instructions. The instructions may be executed by a processor of the server 202 and/or may be communicated to robot networks 210 and/or edge devices 208 for execution on their respective controllers/processors in part or in entirety (e.g., a robot 102 may calculate a coverage map using measurements 308 collected by itself or another robot 102). Advantageously, use of a centralized server 202 may enhance a speed at which parameters may be measured, analyzed, and/or calculated by executing the calculations (i.e., computer readable instructions) on a distributed network of processors on robots 102 and devices 208. Use of a distributed network of controllers 118 of robots 102 may further enhance functionality of the robots 102 as the robots 102 may execute instructions on their respective controllers 118 during times when the robots 102 are not in use by operators of the robots 102.

Figure 3:
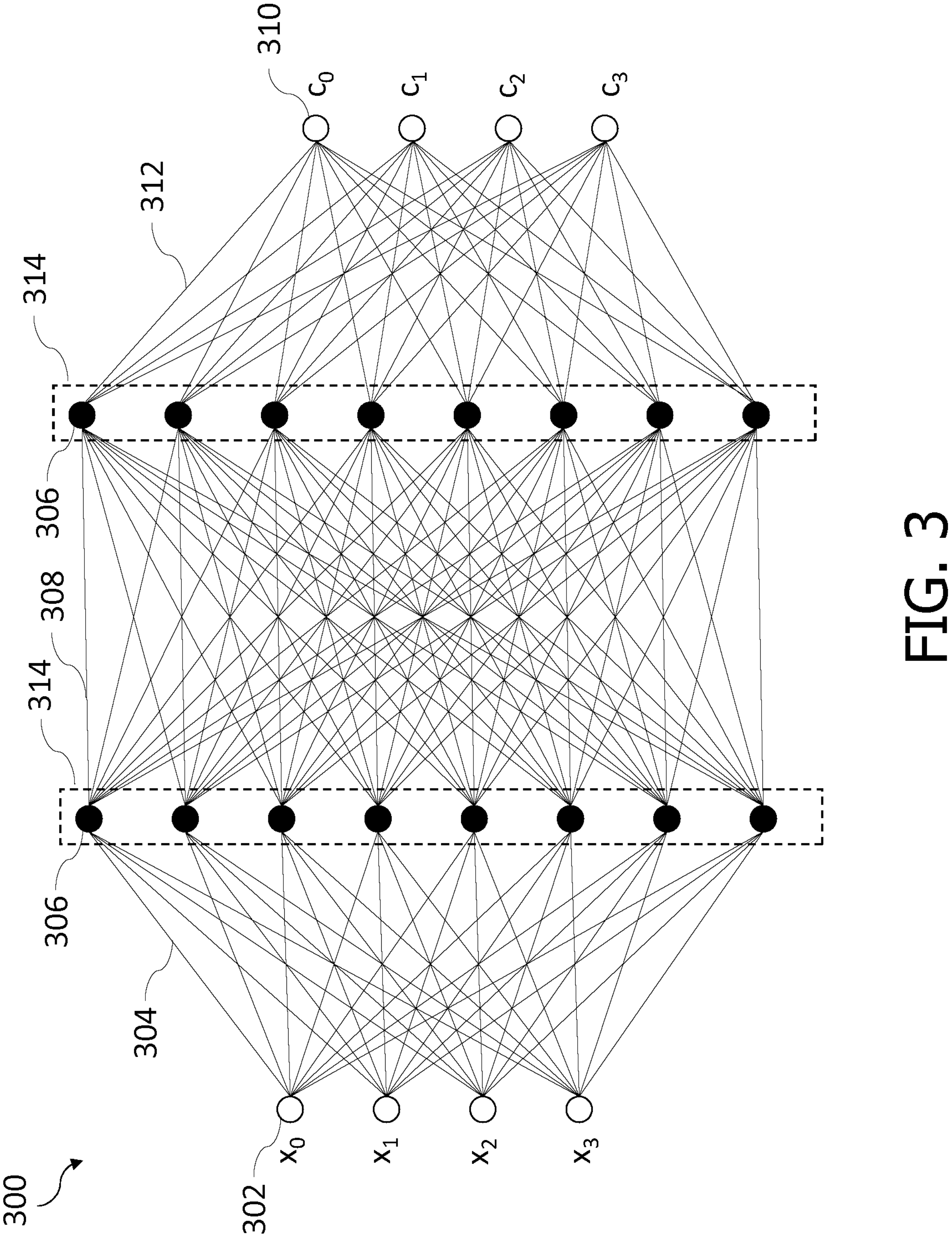
FIG. 3 illustrates a neural network in accordance with some exemplary embodiments of this disclosure.

FIG. 3 illustrates a neural network 300, according to an exemplary embodiment. The neural network 300 may comprise a plurality of input nodes 302, intermediate nodes 306, and output nodes 310. The input nodes 302 are connected via links 304 to one or more intermediate nodes 306. Some intermediate nodes 306 may be respectively connected via links 308 to one or more adjacent intermediate nodes 306. Some intermediate nodes 306 may be connected via links 312 to output nodes 310. Links 304, 308, 312 illustrate inputs/outputs to/from the nodes 302, 306, and 310 in accordance with equation 1 below. The intermediate nodes 306 may form an intermediate layer 314 of the neural network 300. In some embodiments, a neural network 300 may comprise a plurality of intermediate layers 314, intermediate nodes 306 of each intermediate layer 314 being linked to one or more intermediate nodes 306 of adjacent layers, unless an adjacent layer is an input layer (i.e., input nodes 302) or an output layer (i.e., output nodes 310). The two intermediate layers 314 illustrated may correspond to a hidden layer of neural network 300, however a hidden layer may comprise more or fewer intermediate layers 314 or intermediate nodes 306. Each node 302, 306, and 310 may be linked to any number of nodes, wherein linking all nodes together as illustrated is not intended to be limiting. For example, the input nodes 302 may be directly linked to one or more output nodes 310.

The input nodes 306 may receive a numeric value $x_i$ of a sensory input of a feature, i being an integer index. For example, $x_i$ may represent color values of an $i^{th}$ pixel of a color image. The input nodes 306 may output the numeric value $x_i$ to one or more intermediate nodes 306 via links 304. Each intermediate node 306 may be configured to receive a numeric value on its respective input link 304 and output another numeric value $k_{i,j}$ to links 308 following the equation 1 below:

$$k_{i,j}=a_{i,j}x_0+b_{i,j}x_1+c_{i,j}x_2+d_{i,j}x_3 \ldots \quad \text{(Eqn. 1)}$$

Index i corresponds to a node number within a layer (e.g., $x_1$ denotes the first input node 302 of the input layer, indexing from zero). Index j corresponds to a layer, wherein j would be equal to one for the one intermediate layer 314-1 of the neural network 300 illustrated, however, j may be any number corresponding to a neural network 300 comprising any number of intermediate layers 314. Constants a, b, c, and d represent weights to be learned in accordance with a training process. The number of constants of equation 1 may depend on a number of input links 304 to a respective intermediate node 306. In this embodiment, all intermediate nodes 306 are linked to all input nodes 302, however this is not intended to be limiting. Intermediate nodes 306 of the second (rightmost) intermediate layer 314-2 may output values $k_{i,2}$ to respective links 312 following equation 1 above. It is appreciated that constants a, b, c, d may be of different values for each intermediate node 306. Further, although the above equation 1 utilizes addition of inputs multiplied by respective learned coefficients, other operations are applicable, such as convolution operations, thresholds for input values for producing an output, and/or biases, wherein the above equation is intended to be illustrative and non-limiting.

Output nodes 310 may be configured to receive at least one numeric value $k_{i,j}$ from at least an $i^{th}$ intermediate node 306 of a final (i.e., rightmost) intermediate layer 314. As illustrated, for example, each output node 310 receives numeric values $k_{i,2}$ with $i \in [0,7]$ from the eight intermediate nodes 306 of the second intermediate layer 314-2. The output of the output nodes 310 may comprise a classification of a feature of the input nodes 302. The output $c_i$ of the output nodes 310 may be calculated following a substantially similar equation as equation 1 above (i.e., based on learned weights and inputs from connections 312). Following the above example where inputs $x_i$ comprise pixel color values of an RGB image, the output nodes 310 may output a classification $c_i$ of each input pixel (e.g., pixel i is a car, train, dog, person, background, soap, or any other classification). Other outputs of the output nodes 310 are considered, such as, for example, output nodes 310 predicting a temperature within an environment at a future time based on temperature measurements provided to input nodes 302 at prior times and/or at different locations.

The training process comprises providing the neural network 300 with both input and output pairs of values to the input nodes 302 and output nodes 310, respectively, such that weights of the intermediate nodes 306 may be determined. An input and output pair comprise a ground truth data input comprising values for the input nodes 302 and corresponding correct values for the output nodes 310 (e.g., an image and corresponding annotations or labels). The determined weights configure the neural network 300 to receive input to input nodes 302 and determine a correct output at the output nodes 310. By way of illustrative example, annotated (i.e., labeled) images may be utilized to train a neural network 300 to identify objects or features within the image based on the annotations and the image itself, where the annotations may comprise, e.g., pixels encoded with “cat” or “not cat” information if the training is intended to configure the neural network 300 to identify cats within an image. The unannotated images of the training pairs (i.e., pixel RGB color values) may be provided to input nodes 302 and the annotations of the image (i.e., classifications for each pixel) may be provided to the output nodes 310, wherein weights of the intermediate nodes 306 may be adjusted such that the neural network 300 generates the annotations of the image based on the provided pixel color values to the input nodes 302. This process may be repeated using a substantial number of labeled images (e.g., hundreds or more) such that ideal weights of each intermediate node 306 may be determined. The training process is complete upon predictions made by the neural network 300 falls below a threshold error rate which may be defined using a cost function.

As used herein, a training pair may comprise any set of information provided to input and output of the neural network 300 for use in training the neural network 300. For example, a training pair may comprise an image and one or more labels of the image (e.g., an image depicting a cat and a bounding box associated with a region occupied by the cat within the image).

Neural network 300 may be configured to receive any set of numeric values representative of any feature and provide an output set of numeric values representative of the feature. For example, the inputs may comprise color values of a color image and outputs may comprise classifications for each pixel of the image. As another example, inputs may comprise numeric values for a time dependent trend of a parameter (e.g., temperature fluctuations within a building measured by a sensor) and output nodes 310 may provide a predicted value for the parameter at a future time based on the observed trends, wherein the trends may be utilized to train the neural network 300. Training of the neural network 300 may comprise providing the neural network 300 with a sufficiently large number of training input/output pairs comprising ground truth (i.e., highly accurate) training data. As a third example, audio information may be provided to input nodes 302 and a meaning of the audio information may be provided to output nodes 310 to train the neural network 300 to identify words and speech patterns.

Generation of the sufficiently large number of input/output training pairs may be difficult and/or costly to produce. Accordingly, most contemporary neural networks 300 are configured to perform a certain task (e.g., classify a certain type of object within an image) based on training pairs provided, wherein the neural networks 300 may fail at other tasks due to a lack of sufficient training data and other computational factors (e.g., processing power). For example, a neural network 300 may be trained to identify cereal boxes within images, however the same neural network 300 may fail to identify soap bars within the images.

As used herein, a model may comprise the weights of intermediate nodes 306 and output nodes 310 learned during a training process. The model may be analogous to a neural network 300 with fixed weights (e.g., constants a, b, c, d of equation 1), wherein the values of the fixed weights are learned during the training process. A trained model, as used herein, may include any mathematical model derived based on a training of a neural network 300. One skilled in the art may appreciate that utilizing a model from a trained neural network 300 to perform a function (e.g., identify a feature within sensor data from a robot 102) utilizes significantly less computational recourses than training of the neural network 300 as the values of the weights are fixed. This is analogous to using a predetermined equation to solve a problem as compared to determining the equation itself based on a set of inputs and results.

According to at least one non-limiting exemplary embodiment, one or more outputs $k_{i,j}$ from intermediate nodes 306 of a $j^{th}$ intermediate layer 312 may be utilized as inputs to one or more intermediate nodes 306 an $m^{th}$ intermediate layer 312, wherein index m may be greater than or less than j (e.g., a recurrent or feed forward neural network). According to at least one non-limiting exemplary embodiment, a neural network 300 may comprise N dimensions for an N dimensional feature (e.g., a 3-dimensional input image or point cloud), wherein only one dimension has been illustrated for clarity. One skilled in the art may appreciate a plurality of other embodiments of a neural network 300, wherein the neural network 300 illustrated represents a simplified embodiment of a neural network to illustrate the structure, utility, and training of neural networks and is not intended to be limiting. The exact configuration of the neural network used may depend on (i) processing resources available, (ii) training data available, (iii) quality of the training data, and/or (iv) difficulty or complexity of the classification/problem. Further, programs such as AutoKeras utilize automatic machine learning ("AutoML") to enable one of ordinary skill in the art to optimize a neural network 300 design to a specified task or data set.

Figure 4:
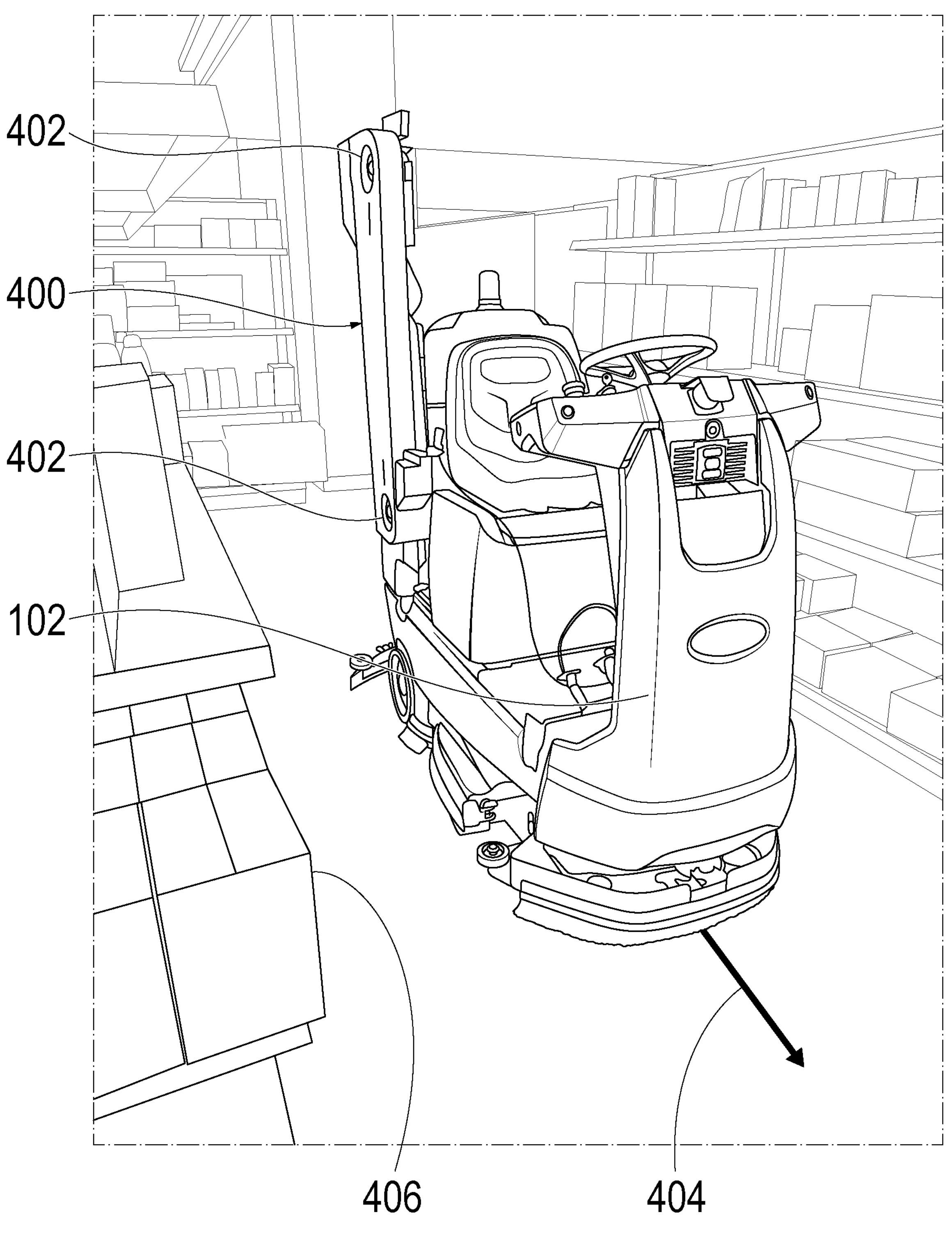
FIG. 4 is a robot comprising a sensing device configured to scan for features within its environment, according to an exemplary embodiment.

FIG. 4 depicts a robot 102 comprising a sensing device 400 navigating a route 404 to scan objects 406 within the environment, according to an exemplary embodiment. The sensing device 400 may be a portion of the robot 102 body or a modular attachment configured to be an optional device for use with the robot 102. For instance, the robot 102 may comprise a ride-on floor cleaning robot 102 configured to navigate routes to clean floors, surfaces, or other objects, wherein the sensing device 400 may be coupled to the robot 102 to enable the robot 102 to, in addition to cleaning, sense nearby objects 406 if desired. In other embodiments, the sensing device 400 may be a component of the robot 102 rather than an optional module, wherein the robot 102 is configured specifically or primarily to scan for features in its environment. In the illustrated embodiment, two imaging cameras 402 are coupled to the device 400, however one skilled in the art may appreciate that more or fewer cameras 402 may be utilized in addition to various other exteroceptive sensor units, such as those described above with respect to sensor units 114. Further the positions and orientations of the cameras 402 are not intended to be limiting. In some embodiments, the sensing device 400 may include a singular 360° camera placed at the top of the device to scan/image in all directions around the robot 102 as it travels the route 404. According to at least one non-limiting exemplary embodiment, the sensing device 400 may further include lights and other features, which enhance image quality under certain conditions. Such conditions may be determined via data from other sensor units 114 and/or robot 102 location (e.g., enabling of lights in dimly lit areas of the environment or disabling them near glass freezer doors to avoid glare).

The path 404 is roughly parallel to the nearest edge of the shelf upon which objects 406 are on due to the 90° orientation of the camera 402 aimed towards the side of the robot 102, wherein moving along the path 404 will configure the cameras 402 to capture images of the objects at normal incidence. Other camera 402 orientations are considered, such as front facing or rear facing cameras 402, or cameras 402 oriented at any angle therebetween. It is to be appreciated that cameras 402 may capture multiple images a second while the robot 102 has not moved substantially along route 404, wherein each image may contain substantial overlap with a preceding image. Attempting to identify features within each image captured may yield many redundant analysis and redundant identifications, which are computationally costly. Image stitching or panoramic construction methods may be utilized to combine images captured into a singular panoramic image such that the single panoramic image is utilized to identify features depicted therein. However, conventional image stitching methods may utilize image-element based matching to stitch the images together. That is, similar pixels (e.g., in color values) or similar groups of pixels of a first and second image are used to align the two images together. Often, in practice however, image stitching using image-elements may cause (i) distortions to features (e.g., objects 406) making feature detection difficult or unreliable, (ii) skipping of features, or (iii) duplication of features. For instance, two images of a shelf taken at two locations, each depicting a plurality of identical boxes, would be difficult to align using image-element based methods alone because without information of the camera translation and relative position of the boxes and camera, it may be uncertain whether a box in the second image corresponds to a box in the first image. For the purposes of tracking inventory, skipped features may be marked as out of stock when they are present and duplicated features may cause numerous issues for inventory tracking/management. Missed items or over-counted items may also cause false positive indications of poor planogram (i.e., optimal display layout) compliance, wherein the false positive indication may suggest a display is not properly configured in accordance with the planogram (e.g., misplaced items).

The systems and methods of the present disclosure improve the construction of a panoramic image, comprising multiple images captured by cameras 402, to reduce computations required for feature identification. Additionally, if the identification of the features is performed separate from the robot 102, communication of a panoramic image reduces data bandwidth used to facilitate the transmission. Unlike typical panoramic stitching as used on, e.g., cell phones or image-element based methods, a robot 102 collects additional information of its location and includes additional environmental context, which improves the constructed panoramic image over conventional methods. The primary advantage of the present subject matter is to reduce the amount of data communicated and processed from the robot to identify features in captured images while preserving accuracy of the resulting feature identification. A key feature used for identification may include price labels or inventory labels, which often include texts or codes which, if readable, can be used to quickly identify a feature. Accordingly, the following figures will be directed at enhancing the resolution (i.e., readability) of these labels within panoramic imagery.

Figure 5A:
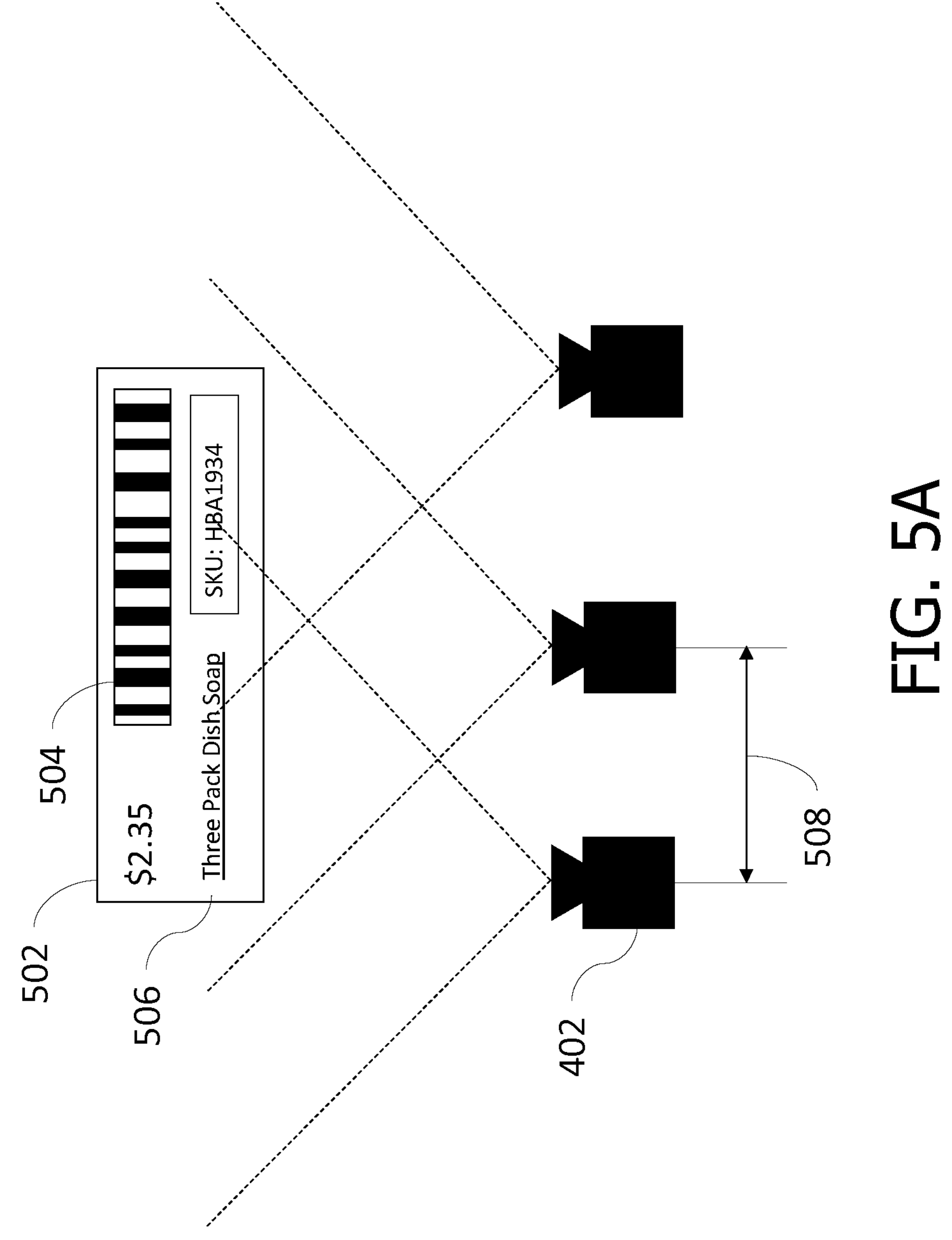
FIG. 5A illustrates a camera capturing images of a label at three different locations during feature scanning, according to an exemplary embodiment.

FIG. 5A illustrates a camera 402 being moved proximate to a label 502 of an object 406 (not shown), according to an exemplary embodiment. Labels 502 can be utilized in environments for inventory tracking and/or price listing, wherein the labels 502 may contain at least partial product information. For instance, the label 502 may include text 506; in the illustrated embodiment the text 506 includes a price, an item description, and a shelf-keeping unit ("SKU") (alpha) numeric identifier. Other text, such as more detailed product descriptions, promotional information, etc. may also be included in some instances. The label 502 may also include computer readable codes 504, such as the barcode shown or quick-response ("QR") codes, which may be utilized with a database (e.g., an inventory database of a store environment) to identify the corresponding product.

One skilled in the art may appreciate that labels 502, and their computer readable codes 504 and text 506, are often small and may therefore be difficult to resolve with a single image as there is a low likelihood the label 502 is depicted perfectly in focus in any given image. Accordingly, the systems and methods herein improve the optical code recognition ("OCR") needed to resolve and read the labels 502.

Figure 5B:
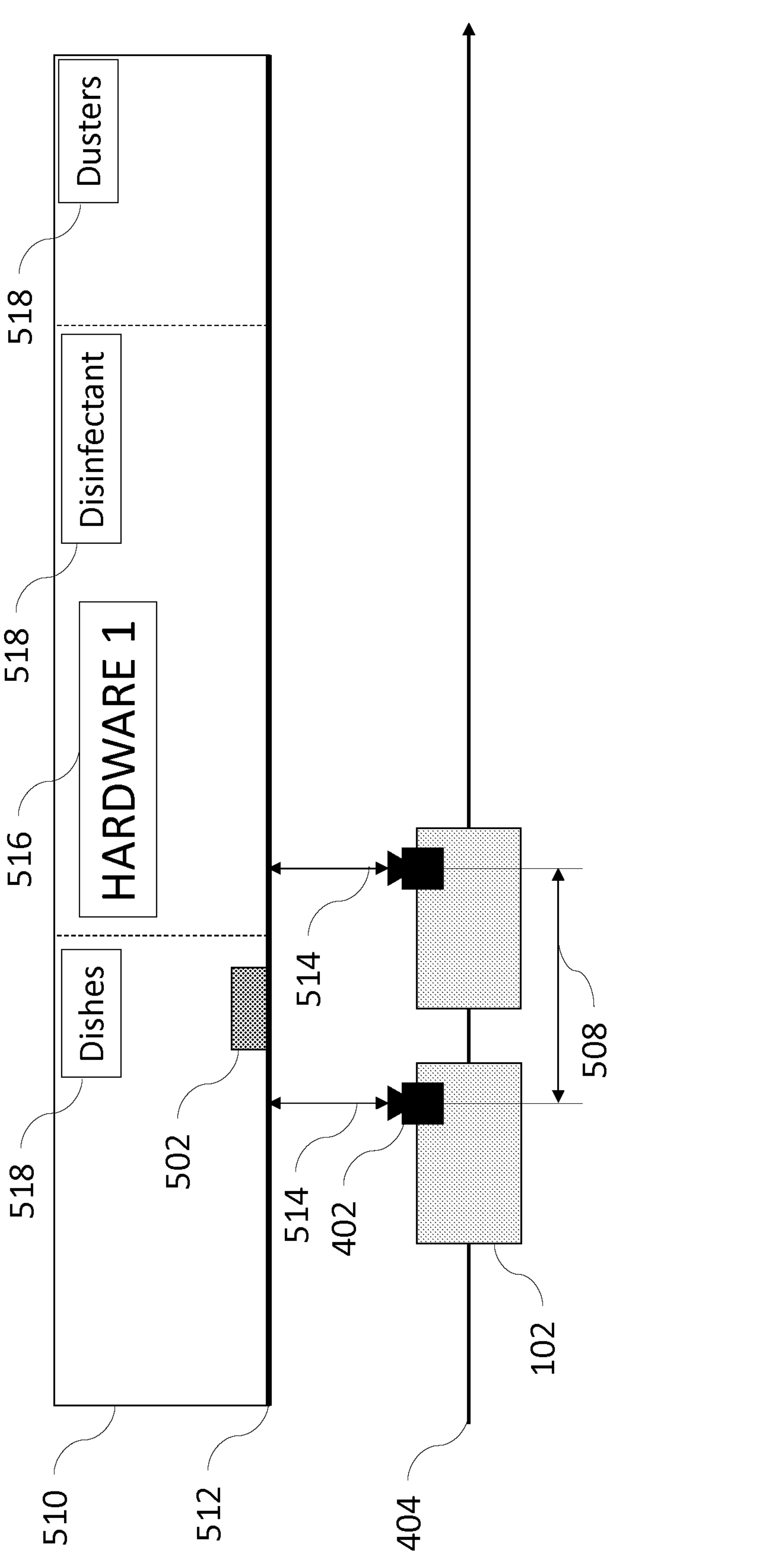
FIG. 5B illustrates a robot capturing images of a label at different locations along a route, according to an exemplary embodiment.

Three camera 402 positions are shown below the label 502, indicating three locations where three respective images are captured of the label 502. The left and rightmost images may depict the label 502 at a different angle and further distance than the middle image. The inter-frame motion of the robot 102 is measured via controller 118 using data from navigation units 106 and various sensor units 114. The inter-frame motion is further measured via feedback from motor commands to actuator units 108 (e.g., for measuring actual translation versus a desired motor command). Precise measurement of the translation of the robot 102 enables calculation of the translation of the label 502 between consecutive images such that the locations of the same label 502 in both images can be accurately determined and, advantageously, robots 102 already accurately localize themselves during operation. Secondly, as shown in FIG. 5B, the robot 102 navigates at a known distance from the label 502, according to the exemplary embodiment. The distance may be measured using data from various exteroceptive sensor units 114 (e.g., LiDAR sensors) and/or computer readable maps showing a location of the object 510 containing the labels 502.

According to at least one non-limiting exemplary embodiment, the robot 102 may include an annotated computer readable map of its environment which includes annotations 516 denoting objects 510 to be scanned for features. The annotated objects 510 are presumed to be static and non-changing in their size and shape. In some instances, the computer readable map may be modified or edited by a human operator if a change to the environment is made, the modifications may include redefining the area occupied by the object 510. For instance, in the illustrated embodiment, the object 510 may include an approximately rectangular shelf comprising home hardware features to be scanned and identified. The annotation 516 "HARDWARE 1" may indicate the object 510 is one of at least one hardware sections within the environment. The annotated object 510 may further include one or more bin-level annotations 518. Bins comprise sub-sections of a scannable object 510, such as particular displays on a shelf, groupings of similar products, or other groupings. The bins are separated via dashed lines within the object 510 in the illustration, representing spatial boundaries between the bins. Bins may be configured by a human (e.g., the human annotating the object 510) to better organize an end report which denotes the identified features and their respective locations. For instance, the end report may provide inventory information of the entire "HARDWARE 1" object 510 and/or certain bins therein, such as the dishes section (e.g., with dish soap, sponges, detergent, etc.). The annotated object 510 may include an edge or surface 512 denoting an approximate 'surface' to be scanned. The edge 512 has a horizontal length corresponding to a length of the object 510 to be scanned for features. When proximate to the distal ends of the edge 512, the robot 102 begins imaging the object 510 until it has reached the opposing side of the edge 512 from which it started the imaging. The object 510 may represent a shelf or other 3-dimensional structure with depth; however, for the purpose of imaging objects on the shelf and their labels 502 it may be approximated as a flat plane located at edge 512. In most retail and warehouse environments, the labels 502 are typically placed at the edge of the shelf along the edge 512 for easier customer viewing. This approximation may be utilized to configure the focal length of the cameras 402 such that objects on the segment 512 are in focus along the direction of distance 514. Using edge 512, a distance 514 may be determined corresponding to the optimal distance between the camera 402 and the objects 406, as well as their corresponding labels 502, to be imaged in focus. In some embodiments, the distance 514 is a pre-determined distance based on the camera 402 parameters needed to capture in-focus images and may be pre-determined by a manufacturer of the robot 102 and/or sensing device 400. Measurement of the distance 514 and 508 greatly constrain image stitching algorithms using data gathered by the robot 102 by enabling the controller 118 to precisely account for inter-frame motion of a label 502 between consecutive images of the label 502.

According to at least one non-limiting exemplary embodiment, a distance measuring sensor such as a LiDAR, depth camera, sonar, or other similar sensors may be utilized to determine distance 514. However, use of distance sensors alone may be prone to error as, if object 510 is a shelf, such sensors may detect the shelf at a farther distance 514 than edge 512 where the labels 502 are placed due to variance in the shelf depth (e.g., caused by different sized objects placed thereon or the lack of objects). It is preferable to utilize the distance sensors to localize the robot 102 to a position on the computer readable map with respect to an object 510 indicated/annotated to be scanned for features and position itself at the distance 514, rather than measure the distance 514 and position itself in accordance therewith as it is difficult to discern if the robot is sensing the surface of the labels 502 or the back-walls of the shelves from distance measurements alone.

Figure 6A:
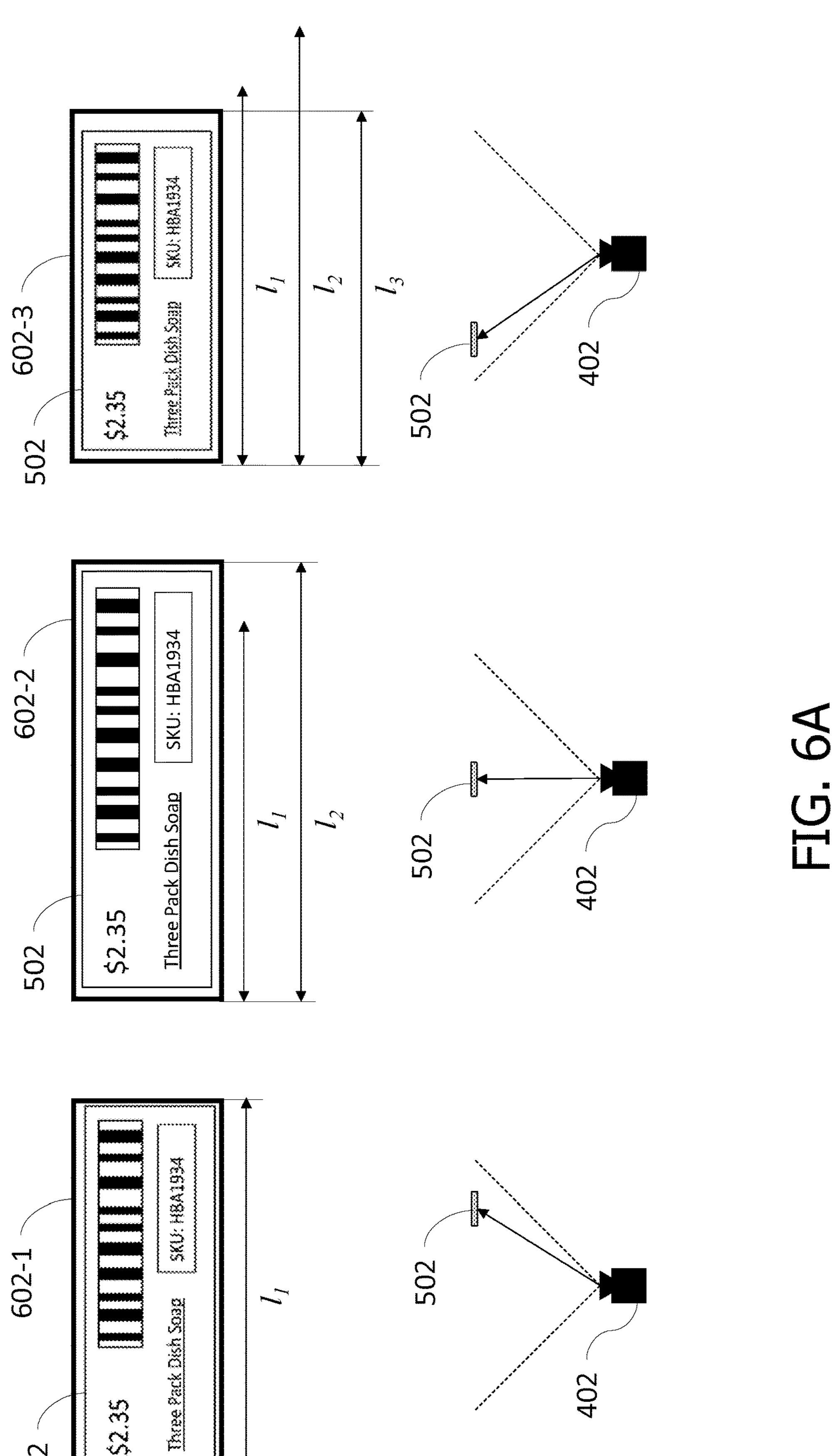
FIG. 6A illustrates three images of a label corresponding to a feature captured by a camera at multiple locations, according to an exemplary embodiment.

In addition to known distances 508, 514, one further constraint may be utilized in the image stitching to enable preservation of detected labels 502: the location of the labels 502 in the environment. To preserve the labels 502 in the resulting panoramic image, labels 502 imaged should not be duplicated nor deleted during the construction of the panoramic. FIG. 6A illustrates a label 502 captured within three images taken at different locations along a route 404, according to an exemplary embodiment. At this stage, using raw image data from the camera 402, OCR may be implemented to identify the presence of labels 502 and place a bounding box 602 surrounding the label 502. The OCR does not need to resolve the text 506 or codes 504 of the label 502 at this stage. Size, color, and aspect ratio constraints may be implemented to separate labels 502 from other text, which may appear on, e.g., a product package. The bounding boxes 602, as shown in the three perspectives, changes shape and size, namely along the horizontal axis wherein it is a maximum when imaged at normal incidence, shown in the center image, and shrinks as the robot 102 approaches or moves away from the label 502, shown in the left and right images. That is, $l_n$ which represents the width of a bounding box for the nth depiction of the label 502 is: $l_1<l_2$ and $l_3<l_2$, wherein $l_1$, could be greater, equal to, or smaller than $l_3$ depending on the situation. Using known camera parameters as well as distances 508, 514, an image-space location and translation of the label 502 may be calculated. Additionally, the location of the label 502 may be determined on the computer readable map. Despite redundant imaging of the label 502, each image should indicate the label 502 being in approximately the same location in space on the map. Accounting for robot 102 translation and/or the locations of the labels 502 in 3D space on a map ensures no labels are skipped or duplicated by providing an accurate method for identifying the same label across multiple images invariant of image-element features (e.g., multiple identical labels 502 in otherwise feature-poor images).

Figure 6B:
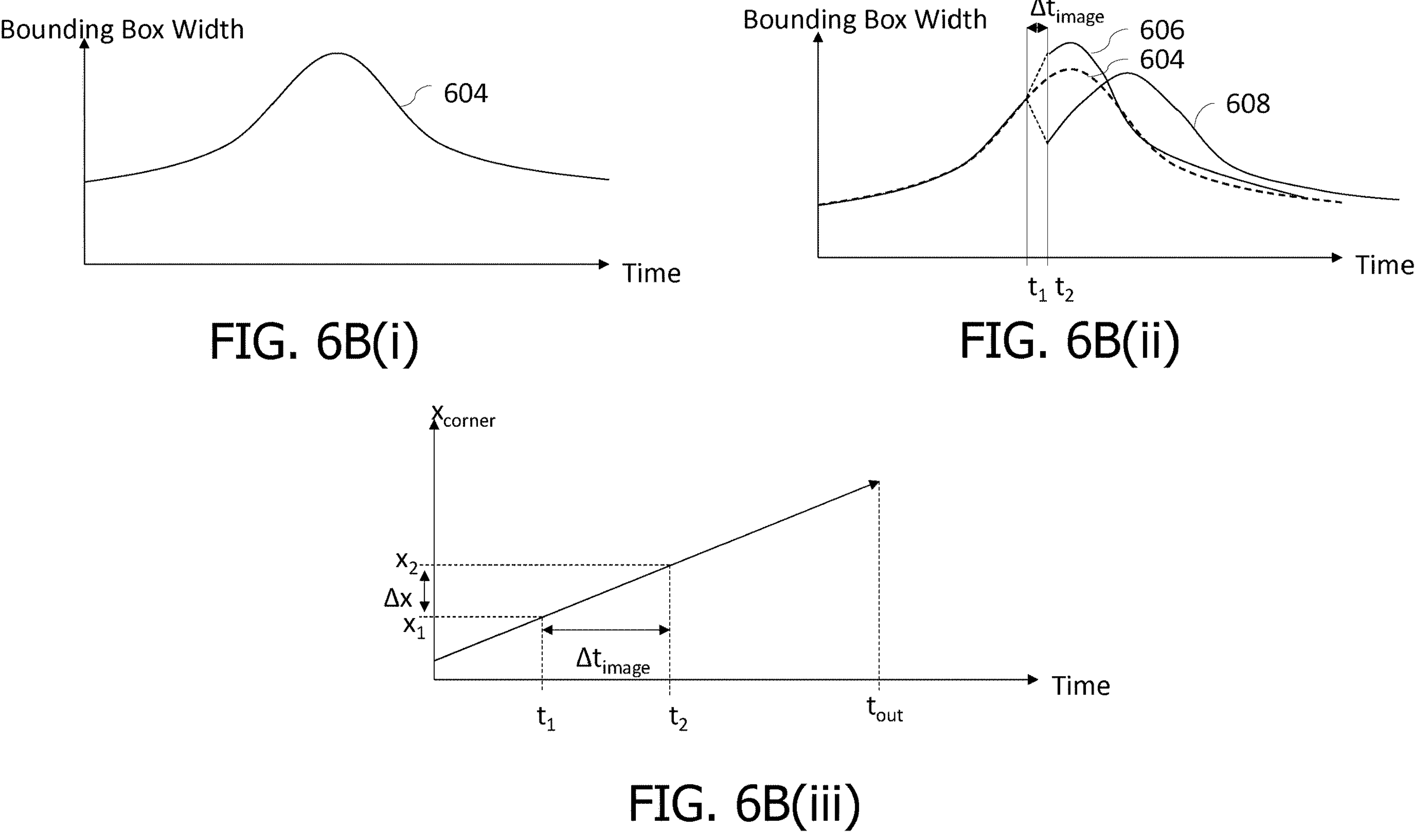
FIG. 6B(i-iii) illustrate various parameters tracked to ensure feature continuity, according to an exemplary embodiment.
Figure 6C:
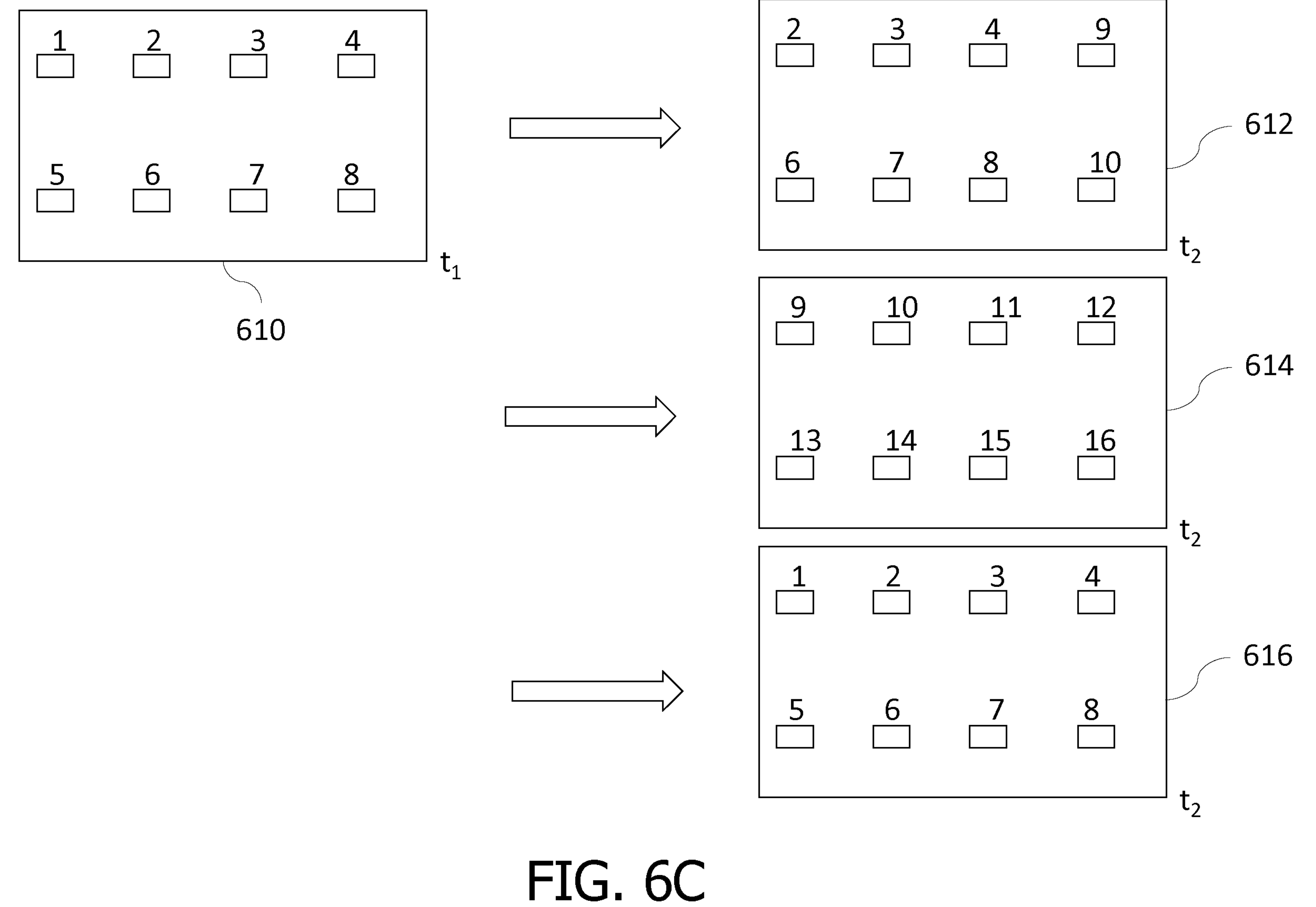
FIG. 6C illustrates a first image and three exemplary subsequent images, one preserving object continuity and two which skip or duplicate features, according to an exemplary embodiment.

FIG. 6B-C illustrate various parameters tracked by the controller of the robot 102 to ensure that labels 502 are not skipped or duplicated, according to the exemplary embodiment. As used herein, object continuity will refer to a static object (e.g., labels 502) being tracked properly across multiple sequential images in a continuous manner which is in accordance with relative motion caused by the robot traveling. For instance, a label moving left to right in an image as a robot moves right to left would be continuous and properly tracked. A label suddenly appearing, disappearing, or jumping position inconsistent with robotic motion would not be continuous and indicative of improper object identification.

As the robot 102 travels and captures images, the labels 502 depicted therein may be identified as labels and encompassed within a bounding box. The bounding box defines the approximate size and shape of the label in image space (i.e., in terms of (x, y) pixels). At this stage, the text of the labels 502 may not be discernable enough to tell if a first label and a second label in two images are the same or different label(s).

First in FIG. 6B(i), a graph illustrating the bounding box width of the label 502 measured as the robot 102 drives past the label 502. The horizontal axis measures time assuming the robot 102 is traveling at constant velocity. As discussed in FIG. 6A above, the label begins at the edge of the image with the smallest width, grows to the largest width when it is centered in the image, and shrinks again as the robot 102 moves past the label 502. Accordingly, the width of the bounding box measured over time for a single label approximates a sine wave 604. Next, FIG. 6B(ii) illustrates two scenarios: a skipped label 502 shown by curve 606 and a duplicated label 502 shown by curve 608.

Skipping, as used herein, refers to identifying two objects as the same or one object. Duplication, as used herein, refers to identifying one object as two separate objects.

Tracking a single label as it moves across an image may be simple as there are no other labels to confuse the feature identification. Tracking multiple identical labels 502 across multiple frames, some of which come constantly into and out of frame, becomes more difficult especially when the text is unreadable. The controller 118 may, for each detected label 502, associate an identifier with the bounding box. The identifier may be a (random) string of bits which are unique to each bounding box in each image. In a first image, the robot may capture three labels with identifiers A, B, and C. In the second image, the robot captures three labels, with identifiers A, B, and C. There is, however, no guarantee that label A in the second image is the same physical label 502 as label A in the first image. Using the size of the bounding boxes and expected size of the bounding box due to the motion of the robot 102 the inter-frame motion of labels can be tracked; the labels can be discerned as distinct objects despite appearing substantially identical.

The value $\Delta t_{image}$ corresponds to the time between captures of sequential images by the robot 102. The horizontal axis measures time assuming the robot 102 is traveling at constant velocity. The horizontal axis may also be considered as $\theta(t)$, or viewing angle of a label 502 as the robot 102 passes by the label 502 overtime. The horizontal axis may also be characterized as x(t) (i.e., horizontal) location of a bounding box in image-space coordinates.

In attempting to detect the presence of a plurality of substantially similar features, such as labels 502 with unresolved text, a few assumptions must be maintained. First, there is also no guarantee that all labels 502 are detected in all images, wherein a newly detected label 502 could be first identified when it is in the center of the image. In some instances, a label 502 may be detected in one image but not in others acquired before and/or after it. Second, there is no guarantee a bounding box in a first image corresponds to the same physical object of a bounding box in the second image with the same identifier, and thus continuity of the object presence must be verified. Advantageously, robotic odometry may be leveraged to verify object continuity. Lastly, as previously mentioned, there is no guarantee that a label seen in one image will be seen in the next (i.e., labels move out of frame) or that labels seen in a current frame were seen in a prior frame (i.e., labels move into the frame).

If the bounding box with identifier A in the first image, captured at time $t_1$, changes width in accordance with curve 604 in the later captured images, such as time $t_2$ or onwards, then the two or more bounding boxes can be associated as depicting the same label 502 and accordingly assigned the same identifiers.

If the bounding box A in the first image, captured at time $t_1$, suddenly increases in width in the second image, as shown by graph 606 for example, this may indicate that bounding box A in the first image and bounding box A in the second image are not the same labels 502. This jump in the curve 606 from the ideal curve 604 represents the bounding box moving too much in the image space too quickly to be caused by the motion of the robot 102, and thus a label is skipped.

Similarly, curve 608 would also display a jump backwards in position of the label 502 which would not be physically possible given the robot 102 velocity. More specifically, bounding box A was growing in images before $t_1$, suddenly shrinks in the image captured at $t_2$, then grows again (in accordance with curve 608 which mirrors curve 604), whereby given the constant velocity of the robot 102 it can be concluded the bounding box A in the images capture at $t_1$ and $t_2$ do not represent the same label 502. Accordingly, the identifier A has been duplicated and associated with two different physical objects.

Although image-space analysis can be useful in constraining image stitching via checking for skipped or double-counted labels 502 (i.e., the same label identified as two or more separate objects), robotic position data can further constrain this continuity analysis of the bounding boxes as shown in FIG. 6B(iii) which illustrates a graph of time as a robot 102 travels at a constant speed and direction versus the x position of a/any corner or edge of a bounding box, according to an exemplary embodiment. Let the +x direction correspond to the opposite direction of the robot 102 direction of travel, such that the apparent motion of static objects in the captured images move along the +x direction. It is assumed the robot 102 travels approximately straight (i.e., no y variance) and experiences no bumps (i.e., no z variance).

It is expected that, based on distance 514 known to the robot 102 and measured via its sensors 114, the pixels to translate at a uniform, approximately linear velocity from right to left (or vice versa) in the image space. Discrete images are taken at times $t_1$ and $t_2$, wherein one or more bounding boxes for labels 502 are identified at both $t_1$ and $t_2$. Based on the known distance 514 (sensor units 114), known velocity of the robot 102 (navigation units 106), known capture rate of the imaging camera ($\Delta t_{image}$), and known viewing angle of the imaging camera, the change in image-space location, $\Delta x$, of the bounding boxes between the first and second images can be determined. $\Delta x$ comprises a value in units of pixels. Based on the location of the bounding box in the first image and $\Delta x$, the controller 118 may associate a bounding box located at $x1+\Delta x=x_2$ in the second image as corresponding to the same object. If a label is skipped or duplicated, the graph may include a jump or drop, indicating the inter-frame motion for a given bounding box identifier (e.g., A) would be larger or lower than $\Delta x$. If its larger, then a label was skipped and if lower, a label is double counted.

The graph extends until time $t_{out}$ corresponding to a time where a label 502 is out of frame. The time $t_{out}$ would be based on (i) the field of view of the camera, (ii) distance 514, and (iii) velocity of the robot 102. Bounding boxes of static objects should not persist in sequential imagery for longer than $t_{out}$ as the robot 102 should have moved beyond the label and thus would not image the label.

To illustrate the above discussed concepts visually, FIG. 6C illustrates a first image 610 taken at a first time $t_1$ and three potential images taken at a later time $t_2$, according to an exemplary embodiment. The first image 610 includes eight (8) bounding boxes, each with an identifier 1 through 8 respectively. In the next image, boxes 1 and 5 move out of view and two new boxes come into view. The labels exist in a feature-poor environment and are arranged in a substantially uniform fashion.

The three potential images represent: (i) the correctly identified case 612, (ii) a duplicate label case 614, and (iii) a skipped label case 616. In image 612, the two boxes 1 and 5 are not identified again, based on their continuous leftward movement induced by the robot 102, and the new boxes in the frame are provided with new identifiers 9 and 10. The image-space translation of boxes 2-4 and 6-8 can be calculated and constrained based on data from odometry.

In image 614, however, the controller 118 incorrectly identifies label 2 with 9, label 3 with 11, label 4 with 12, etc. In other words: the controller 118 predicts the labels in the image 614 are different labels than in image 610. This prediction can be disproven using the motion continuity analysis shown and described in FIG. 6B(i-iii) when considering the motions of the robot 102 and assuming the labels 502 are static objects. For instance, identifier 4 would have had to move the entire length of the image 610 for new identifiers 9-16 to be depicted while none of the previous identifiers 1-8 are depicted, which would disagree with data from odometry.

In image 616, label 2 of image 610 is associated with identifier 1 in the image 616, label 3 is associated with identifier 2, and so forth. This would correspond to a double counting of the object of the identifier 2 in image 610. Specifically, in image 616, identifier 1 should be identifier 2 but instead identifier 1 appears again (when it has moved out of frame in the physical space), thereby causing a double counting of the identifier 1 presence, as well as the other identifiers 2-8. Identifier 2 in image 610 has not moved in the image space as identifier 2 in the image 616 when the robot 102 knows it has moved, thereby indicating the identifier 2 in image 616 does not correspond to the identifier 2 in the first image 610. Accordingly, the label 502 of identifier 1 in image 610 in the subsequent image is associated with the label 502 of identifier 2 in image 610 and thus a skip occurred.

FIG. 6B-C describe a method for preserving label continuity under a worst-case scenario of static labels 502, undiscernible from one another, which are arranged in a uniform manner (e.g., the grid in image 610). In some embodiments, the relative positions of the bounding boxes with respect to other bounding boxes and/or other salient features of the scene may be utilized to determine object continuity under the assumption that the labels 502 do not move. However, such method may fail to properly identify labels as distinct objects in environments which are substantially uniform and feature poor (e.g., warehouses), which may cause skipping and/or duplication of the labels 502.

According to at least one non-limiting exemplary embodiment, every label detected via a bounding box in every image may be assigned a unique identifier, wherein the controller 118 and/or processor 130 of a server 202 may utilize the image continuity analysis as described herein to associate bounding boxes of the same physical labels 502 to each other within the sequence of images. Such analysis may be performed after the robot 102 has completed its route and/or tasks such as to not over-burden the controller 118 with computations in some embodiments.

Figure 7:
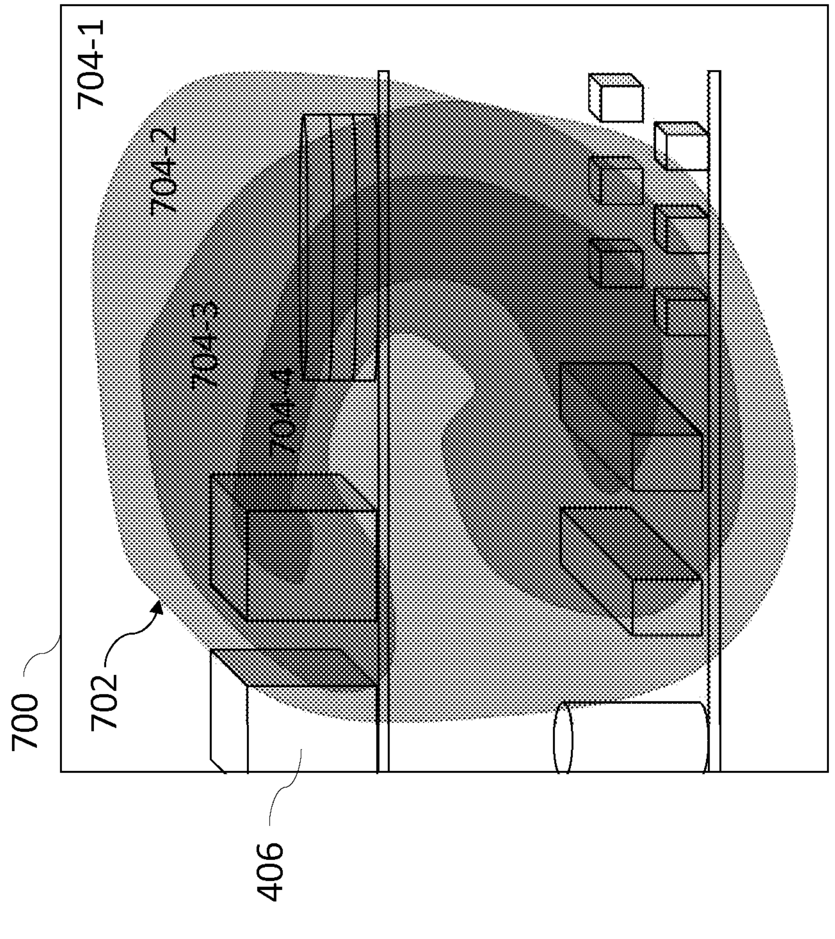
FIG. 7 illustrates an image quality matrix used to evaluate a resolution of certain regions of an image, according to an exemplary embodiment.

Despite the geometric location of the labels 502 being measurable, the text on the labels 502 may still remain unresolved due to other noise, perturbations experienced by the robot 102 (e.g., vibrations) and other factors related to the camera 402 intrinsic parameters. FIG. 7 illustrates an image quality matrix 702 overlaid on an image 700 captured by a camera 402, according to an exemplary embodiment. The image quality matrix 702 indicates, for each pixel of the image, the approximate resolution quality thereof. It is appreciated that no camera 402 nor lens can be perfect and may degrade over time during. Further, when imaging a flat surface, such as edge 512, it is appreciated that not all points of the planar surface are at the focal distance (which is defined radially from the focal point) and may be out of focus. For instance, the edges of the lens may cause the corners of the image to be less in focus than the centermost pixel of the image, especially when imaging a vertical plane (e.g., edge 512). The image quality matrix 702 is illustrated using four regions separated by a threshold quality value, however it is appreciated that the separate discrete regions are shown for only illustrative purposes. First, a region 704-1 may comprise the least in-focus pixels, typically near the edges of the image 700. Region 704-2 may comprise slightly higher resolution pixels than region 704-1, and so forth for regions 704-3 and 704-4. As shown the regions 704 roughly approximate the center of the camera lens and increase in quality towards the center of the image 700. However, due to small imperfections in the lens unique to the camera 402 used, the shape of regions 704 is non-uniform. An ideal, perfect camera imaging a flat plane at normal incidence would include an image quality matrix 702 comprising regions 704 shaped as concentric circles, however in practice no camera lens is perfect. When attempting to resolve small text of labels 502 the specific deformations of the specific lens (which can also change over time) used to image the labels 502 needs to be accounted for and cannot be resolved with a pre-determined image quality matrix for all camera lenses.

The resolution quality values of the matrix may be determined via detection of sharp transitions in color between adjacent pixels of the image 700. The clearest sample to test sharp transitions may include labels 502, which are typically black text on a white label with no gradients. Ideally, if imaged perfectly, the black text should be surrounded by pixels which are white, however due to imperfect image resolution often one or more grey pixels may be imaged in between the two-color boundary if the camera is unable to resolve the color of the pixel, indicating a lower resolution. Additionally, since the bounding boxes 602 for text have been detected, determining pixel-wise resolution via color boundary transitions becomes trivial and repeatable for a plurality of images. It is appreciated that the more images used to determine the quality matrix 702 the more accurate the mapping of the image quality becomes.

According to at least one non-limiting exemplary embodiment, the image quality matrix 702 may be a pre-determined calibrated tensor calculated prior to navigation of the robot 102. For instance, an operator may hold up a black and white checkered board (or other pattern with sharp color transitions) to the camera at a known distance 514, wherein a similar color transition analysis may be performed. It is still highly preferred that the image quality matrix 702 be determined for each camera of each robot 102 as there is no guarantee all lenses of those cameras include the same defects.

Returning to FIG. 6A, the computer codes 504 and/or text 506 of the labels 502 will now be resolved. It is appreciated that the OCR used to identify bounding boxes 602 is not required yet to read the codes 504 or text 506. As discussed above, the robot 102 may capture multiple images of a same label 502, thereby providing a plurality of reference data from which to construct a higher resolution image of the label 502. That is, the controller 118 may receive a plurality of images of the label 502, determined via a bounding box 602, and combine the bounded images to produce an output image of the label 502 with sharper resolution to aid in later feature identification.

First, the aspect ratio of the three bounding boxes 602 may be normalized to the aspect ratio of the bounding box 602-2, or whichever is the largest bounding box of that label 502 imaged. Since bounding box 602-2 comprises the largest aspect ratio, it is most likely the bounding box for the label 502 taken closest to normal incidence and likely is depicted in the approximate center of the image. The three bounded images of the label 502 may then be combined on a pixel-wise basis to produce a single high-resolution image of the label 502. While merely overlaying and averaging color values may be sufficient in some cases, small text and computer readable codes may still be unresolved or even obfuscated further using this simplistic approach. Ideally, the text and background will have sharp transitions with no intermediary pixels of colors in between the text and background colors. Accordingly, the averaging may be weighted using the values of the image quality matrix 702 shown in FIG. 7.

For instance, if bounding box 602-1 is fully contained within a highest quality region 704-4 of the image quality matrix 702, the color values of the label 502 within that bounding box may be weighted more heavily than color values of a normalized bounding box 602-3 which may lie within a lower quality region 704-2 for example. A similar weighting may be utilized for aspect ratio changes, wherein a bounding box 602 which does not need to change its aspect ratio may have its color values weighted more heavily than color values of a bounding box 602 which does change aspect ratio significantly. By accounting for aspect ratio changes of the bounding boxes 602-1, 602-2, 602-3 due to robot 102 motion in addition to accounting for high resolution pixels of the individual images unique to the camera 402, the resulting combined image of the label 502 is of higher resolution and its codes 504 and text 506 are more likely to be resolvable by OCR during feature identification.

According to at least one non-limiting exemplary embodiment, the combination of the three normalized bounding boxes 602-1, 602-2, and 602-3 may be performed using a winner takes all determination. That is, for each pixel of the bounding box, the output color value would be the color value of the highest weighted pixel within either of bounding box 602-1, 602-2, or 602-3. The weights may be decreased if the aspect ratio is changed or if the pixel within a given bounding box is contained in a lower quality region 704, thereby favoring color values for pixels which are (i) imaged in high quality regions, and (ii) have an unchanged aspect ratio.

It is appreciated that the improved resolution of the labels 502 is only performed within the boundaries of the bounding boxes 602. That is, no resolution quality improvements are performed outside the bounding boxes 602 as products/features may have various complex color transitions, which, unlike black and white text labels, may be difficult to identify resolution (i.e., the image quality matrix 702) from the image alone. Black text on a white, or other uniform color e.g., yellow, label 502 provides a sharp and reliable reference color transition to determine resolution quality. The improved resolution images of the labels 502, which are at known geometric locations in the environment, may be utilized within the panoramic image to improve the resolution of the text 506 and/or codes 504 of the panoramic image.

According to at least one non-limiting exemplary embodiment, using the OCR detection of the label 502 locations, the resolution quality within each bounding box may be determined using pixel wise color-transition analysis within the bounding boxes. For instance, a high-resolution bounded image of a label 502 would include very few transitionary pixels (i.e., pixels which are in between the text and background color), and a low-resolution bounded image would include many transitionary pixels. Accordingly, the bounding box comprising the fewest transitionary pixels may be weighted more heavily than bounding boxes with many transitionary color pixels in determining the output combination of the bounded labels.

Figure 8:
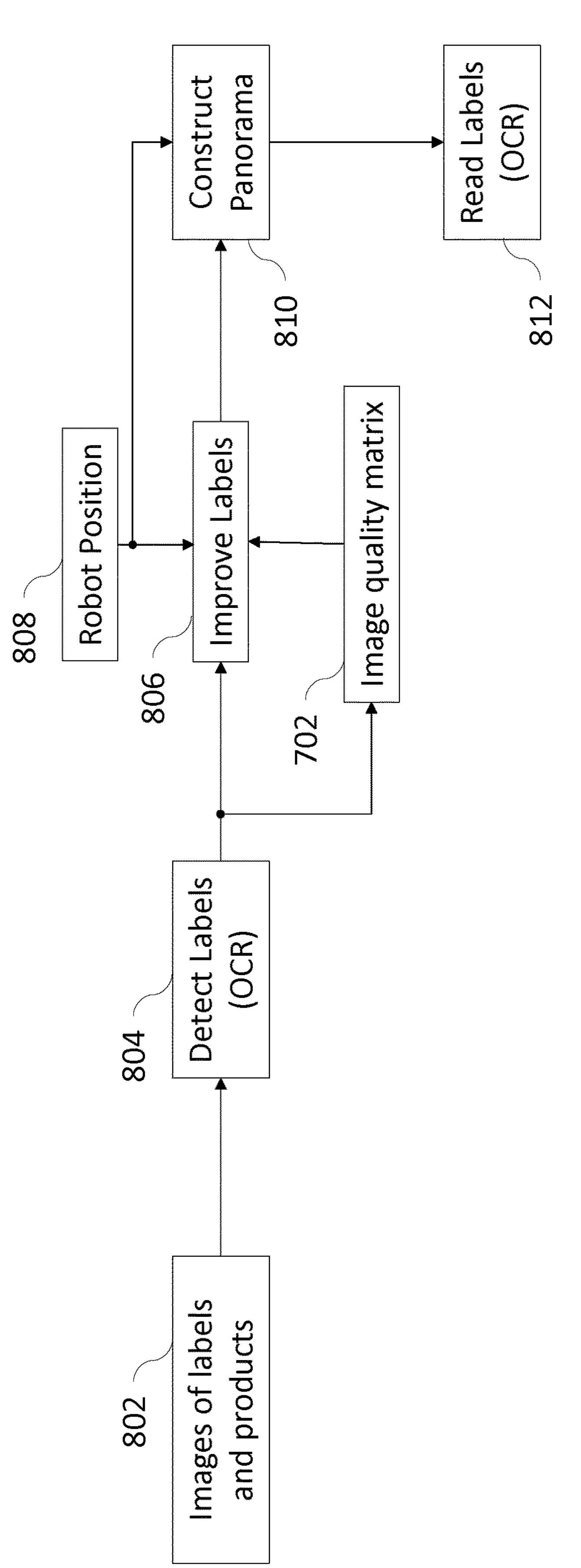
FIG. 8 is a functional block diagram illustrating a system configured to scan and identify features in an environment of a robot, according to an exemplary embodiment.

FIG. 8 is a functional block diagram illustrating the steps a controller 118 of a robot 102 performs to scan for and identify features within images captured by a sensing device 400 of a robot 102, according to an exemplary embodiment. The functional blocks illustrated represents types of data processed by the controller 118 and/or functions the controller 118 performs via executing computer readable instructions from memory 120. Block 802 includes the controller 118 receiving images of labels 502 and corresponding products 406. That is, the controller 118 is receiving images as the robot 102 moves, the images depict the shelves, displays, or other features to be identified. These images may comprise substantial overlap in their fields of view.

The OCR block 804 places bounding boxes on detected labels 502, wherein the labels 502 include text 504 and/or computer codes 506. OCR block 804 is not necessarily configured to predict what the text of the labels 502 says, rather it must detect the presence of labels 502. The text 504 and/or codes 506 may include sharp color transitions such as black on white. The controller 118 analyzes the sharpness of the color transitions within the bounding boxes 602 to determine, for each pixel of the camera, an image quality matrix 702. In some embodiments, the image quality matrix 702 may be calibrated beforehand and retrieved from memory 120 rather than being continuously updated using new images. The functional block diagram illustrates the image quality matrix 702 being updated in real time for each image acquired, however it is appreciated that the image quality matrix 702 could be updated once per route run, once per day, or other frequency. In accordance with the process described above in reference to FIGS. 6-7 for a given label 502, the image quality matrix 702 is utilized in conjunction with a plurality of images of the label 502 to improve the resolution of the imaged label 502. The robot position 808 information, which may include localization data, computer readable maps, and other contextual data elements indicating robot 102 state, may also be utilized to correlate bounding boxes within separate images to a same label 502 based on the geometric position of the robot 102 and image-space location of the bounding boxes 602.

Once the labels 502 have been improved, more specifically the bounding box region has improved resolution, the improved labels are then utilized to construct a panoramic image 810. The panoramic image may be constructed by accounting for the robot position 808 in between sequential images (i.e., distance 508 of FIG. 5A-B) and distance to the labels 502/edge 512. Within the panoramic image includes a plurality of labels 502, each with a corresponding bounding box 602, and the pixels within the bounding boxes have improved resolution. Upon construction of the panoramic image, the codes 504 and/or text 506 of the labels 502 may be resolved to enable feature identification by the second OCR block 812 configured to read the text of the improved-resolution labels 502. The identification of the features within the panoramic image may be performed via controller 118 executing computer readable instructions from memory 120, or the panoramic image may be communicated to a remote server 202 for processing thereon separate from the robot 102.

According to at least one non-limiting exemplary embodiment, the OCR reading of the text or computer readable codes in block 812 is performed on the images with improved-resolution labels prior to or separate from the panoramic image constructed from those images. In conjunction with the motion continuity analysis described in FIG. 6A-C above, OCR analysis 812 being performed on individual images may improve redundancy, and thus feature identification accuracy, at the cost of increased data processing/transmission. The panoramic image may be utilized to display the results of the feature identification in a single, readily human understandable image.

According to at least one non-limiting exemplary embodiment, the controller 118 of the robot 102 may be configured to transmit the image data, image quality matrix, and odometry data collected to a server 202, wherein the server 202 may perform any of the processes in blocks 806 through 812. This may be advantageous for robots 102 which operate continuously and/or robots 102 with limited computational recourses, for a trade-off of increased communications bandwidth (i.e., cost).

Figure 9:
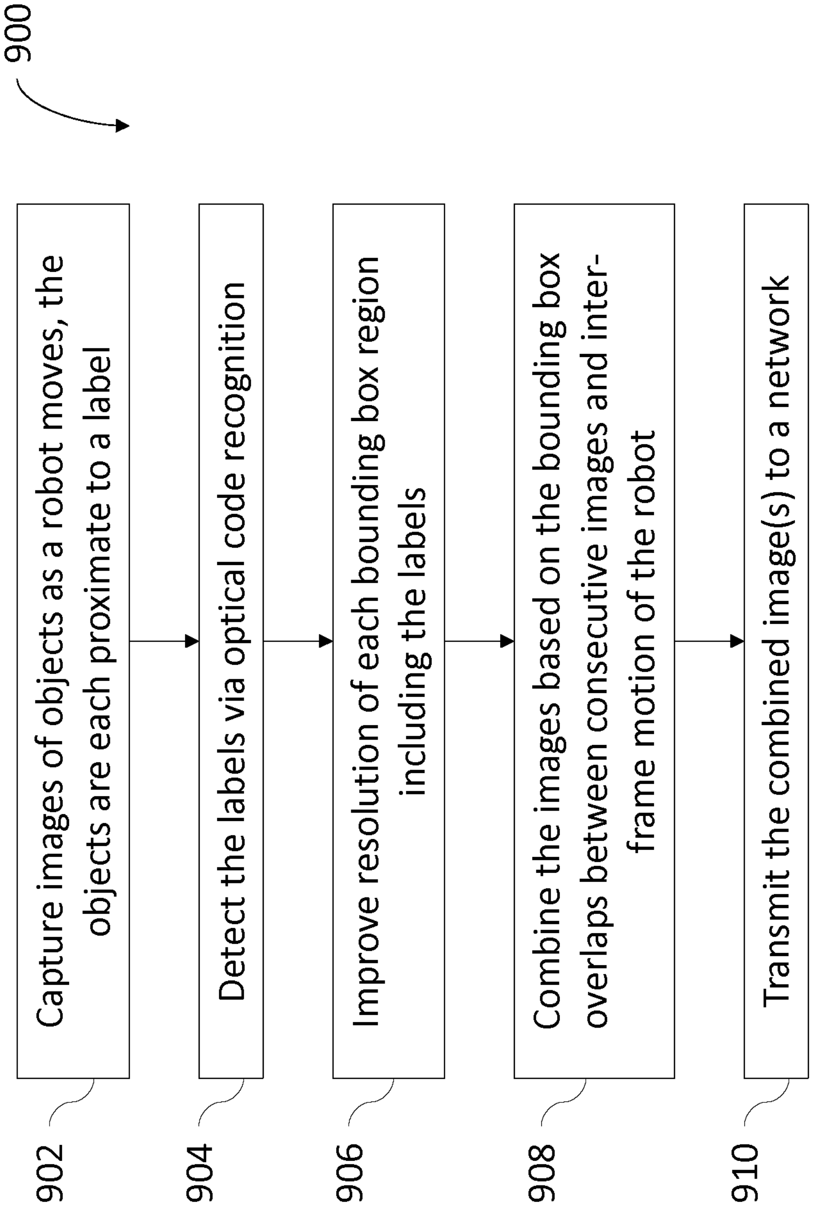
FIG. 9 is a process flow diagram illustrating a method for a system to scan for and identify features in an environment of a robot, according to an exemplary embodiment.

FIG. 9 is a process flow diagram illustrating a method 900 for a controller 118 to construct a panoramic image used for feature identification, according to an exemplary embodiment. Although not explicitly stated, one skilled in the art will appreciate the steps of method 900 are effectuated via the controller 118 executing computer readable instructions from memory 120.

Block 902 includes the controller 118 capturing a plurality of images of objects as the robot 102 moves, the objects being proximate to a label 502. The label 502 may include at least one of a computer readable code 504 or text 506 thereon. Typically, the codes 504 and texts 506 comprise high color contrast in order to be easily detected by sensors (e.g., handheld barcode scanners) or humans. Text 506 typically is placed with sharp, distinct lines around the borders of the letters thereby providing sharp color transitions, which may be useful in determining a resolution of an image of the color transitions. Similarly, typical codes 504 are black and white with sharp transitions. In some instances, the labels 502 may include non-white background colors, such as yellow, beige, blue, or other color, however the difference between the color of the background and codes 504/text 506 should be distinct.

Block 904 includes the controller 118, for each image acquired, detecting the labels 502 therein via optical code recognition. The OCR is not required to, at this stage, resolve the words/letters of the text nor lines/squares of codes 504, rather the controller 118 must identify the locations of various labels 502 or features suspected as labels 502. False positive label 502 detection will not impact later feature identification, however false negative label 502 detection may impact feature identification. A false positive detected label 502 will be unreadable by later OCR, and thus not yield any incorrect product or feature information. A false negative detection, however, will cause a label 502 and corresponding product or feature to be missed, potentially yielding an out-of-stock item which was actually present. Accordingly, it is preferable to reduce the false negatives of the label 502 detection, wherein false positives are permissible. Each label 502 may subsequently be assigned a bounding box surrounding the label 502, preferably matching the aspect ratio of the label 502 with minimal over/under estimation of its size.

Block 906 includes the controller 118 improving the resolution of each bounding box corresponding to each label 502 using data from multiple images of the same labels 502. As described in FIGS. 6-7 above, a given label 502 may appear multiple times in sequential images as the robot 102 navigates nearby. These images may each depict the label 502, or portions thereof, in a higher or a lower resolution. The regions which are depicted in high resolution may be determined via a calculated image quality matrix 702.

The image quality matrix may be determined via a pixel-wise detection of sharp color changes, preferably using pixels within bounding boxes 602 which include labels 502 because labels 502 are known to include sharp color transitions. An ideal (i.e., perfect) resolution image of a barcode, for example, would have each bar uniquely resolved, wherein the pixel values would only be black or white. In practice, barcodes are not aligned with the pixel orientation of the image, are blurry, and suffer from other small imperfections of the camera lens which may cause some of the bars thereof to blur into adjacent white pixels, often creating grey transitionary pixels between a white bar and black bar. The number of transitionary pixels, i.e., pixels which are neither black nor white, and the color values thereof, i.e., the 'greyness' of the pixel(s) in the barcode example, would indicate the quality of the given pixel in the image. Controller 118 may utilize a plurality of previous images aggregated over a period (e.g., a prior route run, a prior day, or over a device lifetime) to determine the image quality matrix 702 based on these color transition boundaries and update the image quality matrix over time to account for small defects in camera lens caused by, e.g., wear and tear, vibrations, heat, and other phenomena.

Since these images are being acquired on a robot 102, which can localize itself in its environment, the locations of the detected labels 502 may be determined within the environment. Such location information further constrains the next step in block 908 to ensure no labels 502 are neither duplicated nor skipped.

Block 908 includes the controller 118 combining the images (acquired in block 902, now with enhanced resolution for each bounding box 602 for each label 502) into a panoramic image based at least in part on inter-frame motion of the robot 102. By accounting for the different location of the bounding box in a first and a second image in conjunction with the known translation of the robot 102 and distance 514 between the camera 402 and label 502, the controller 118 may more accurately align the two sequential images. Due to typical noise and imperfect localization, this alone will not cause the two bounding boxes of a same label 502 to overlap perfectly, however the two bounding boxes will be substantially close greatly reducing the chance of a duplicated/removed label occurring during construction of the panoramic. More precise pixel-wise alignment, e.g., using color analysis or aligning bounding boxes, may be performed subsequent to the robot-motion based alignment to construct a more realistic panoramic image free from skipped or duplicated labels.

Block 910 includes the controller 118 communicating the panoramic image to a server 202 for feature identification. Communication of the single panoramic image includes far lower data than transmission of all the images captured in block 902 due to the images including substantial overlap. Further, use of a single or few panoramic image(s) reduces the computations needed to identify the features thereon by reducing the number of redundant feature identifications caused by the overlap in the sequential images. The controller 118 does not delete the acquired raw images as, in some instances, it may be necessary to utilize the individual images to improve feature identification on an as-needed basis, wherein the server 202 may request additional images if one or more features are detected with low confidence in the combined image.

According to at least one non-limiting exemplary embodiment, steps 904-910 of method 900 may be performed after the robot 102 has executed an entire route and captured all the images it is tasked to acquire. Such offline processing may be advantageous for robots 102 with low processing bandwidth during navigation.

Figure 10A:
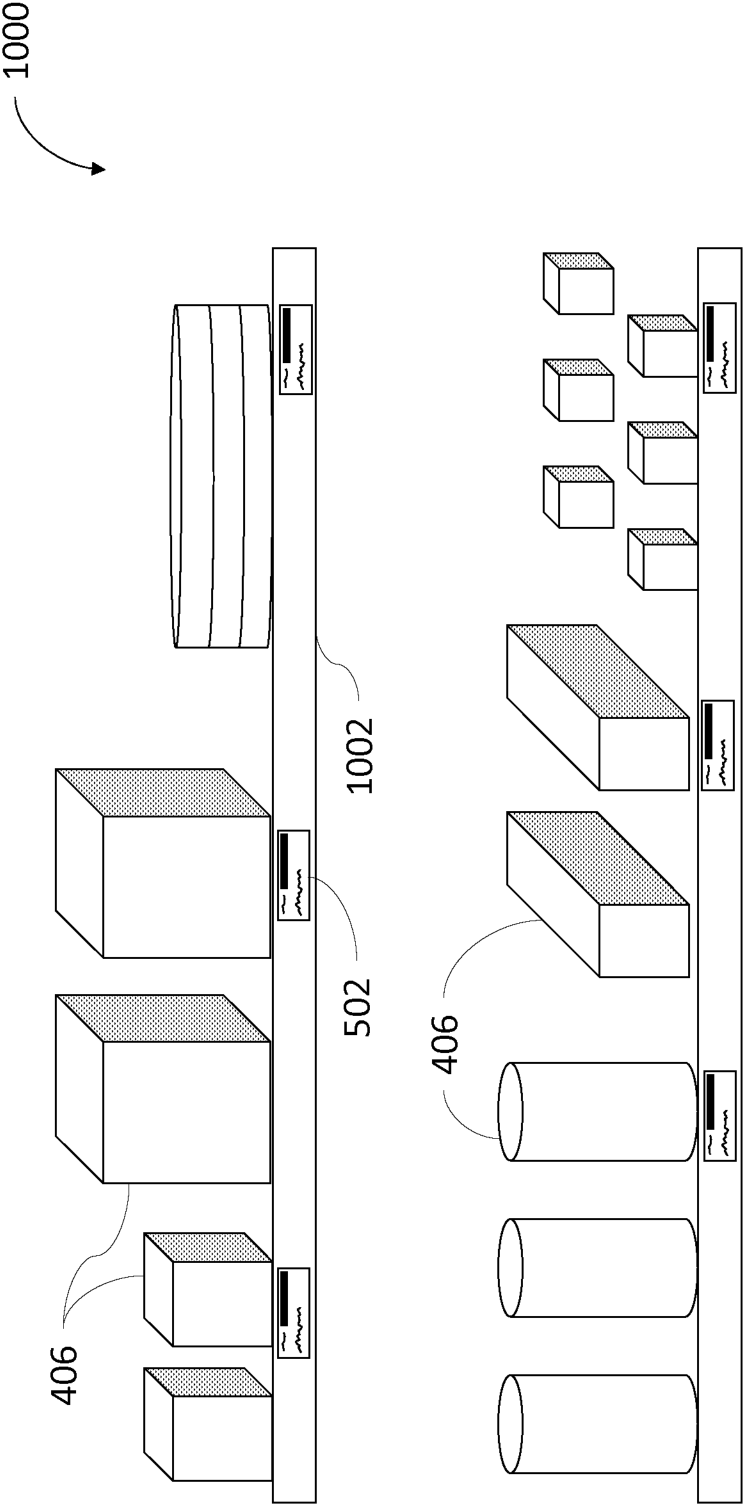
FIG. 10A-C illustrate construction of a panoramic image and improvements to resolution of labels therein, according to an exemplary embodiment.

To illustrate the process 900 visually, FIG. 10A is an exemplary shelf 1000 comprising a plurality of objects 406 thereon to be identified, according to an exemplary embodiment. The shelf 1000 includes racks 1002, which hold the objects 406 and contain a plurality of labels 502, which correspond to a certain type of object 406. The shelf 1000 comprises an object to be scanned for features thereon and indicated as such on a computer readable map, e.g., as shown via annotations in FIG. 5B above. As a robot 102 passes by the shelf 1000, its camera 402 may capture at least two sequential images depicted next in FIG. 10B according to the exemplary embodiment. Images 1004-A and 1004-B are captured sequentially as the robot 102 moves rightward along the page. As shown, a plurality of the objects 406 are imaged twice.

Projected onto each image is a graphical representation of an image quality matrix 702, including various regions 704 discussed in reference to FIG. 7 above. For clarity of discussion, the alignment and resolution improvements discussed in method 900 will be applied to one of the labels 502 depicted in images 1004-A, 1004-B, wherein one skilled in the art may appreciate the same method is applied to all labels 502 depicted within both images 1004-A, 1004-B. An expanded view 1006-A of a label 502 depicted in image 1004-A is shown as comprising a fully dark grey region corresponding to a highest quality region 704-4 of the image quality matrix 702. Similarly, in expanded view 1006-B, the same label 502 is depicted in both a medium quality region 704-3 and low-quality region 704-2. In both images, the label 502 is defined by a bounding box 602 which is determined based on detection of optical characters (i.e., OCR) and, in some instances, those characters comprise certain color characteristics (e.g., black+white or other label colors).

The pixels within each bounding box 602 may be combined via a weighted average of color values, wherein the pixels of the bounding box in image 1004-A may be given higher weight than pixels of the bounding box in 1004-B. For instance, if a given pixel in image 1004-A is black and a corresponding pixel in the image 1004-B is light grey, the resulting pixel will be substantially black. In some embodiments, the averaging may comprise a per-pixel winner-takes-all determination of black or white values. In the prior example, the resulting pixel will be the color in the first image 1004 A since the higher quality region 704-4 weighs more heavily than the lower quality regions 702-2, 702-3.

Additionally, since each bounding box 602 for each label 502 is detected, the displacement of the robot 102 between frames 1004-A, 1004-B is measured, and distance 514 to the labels 502 being known, the controller 118 may ensure that no label 502 is duplicated or deleted when combining the images by accounting for image-space translation of the labels 502. Further, this navigation data may aid the controller 118 in determining which two bounding boxes 602 for two images 1004-A, 1004-B correspond to the same label 502 without relying on image-element based alignment methods which are prone to duplication/deletion of labels.

Figure 10B:
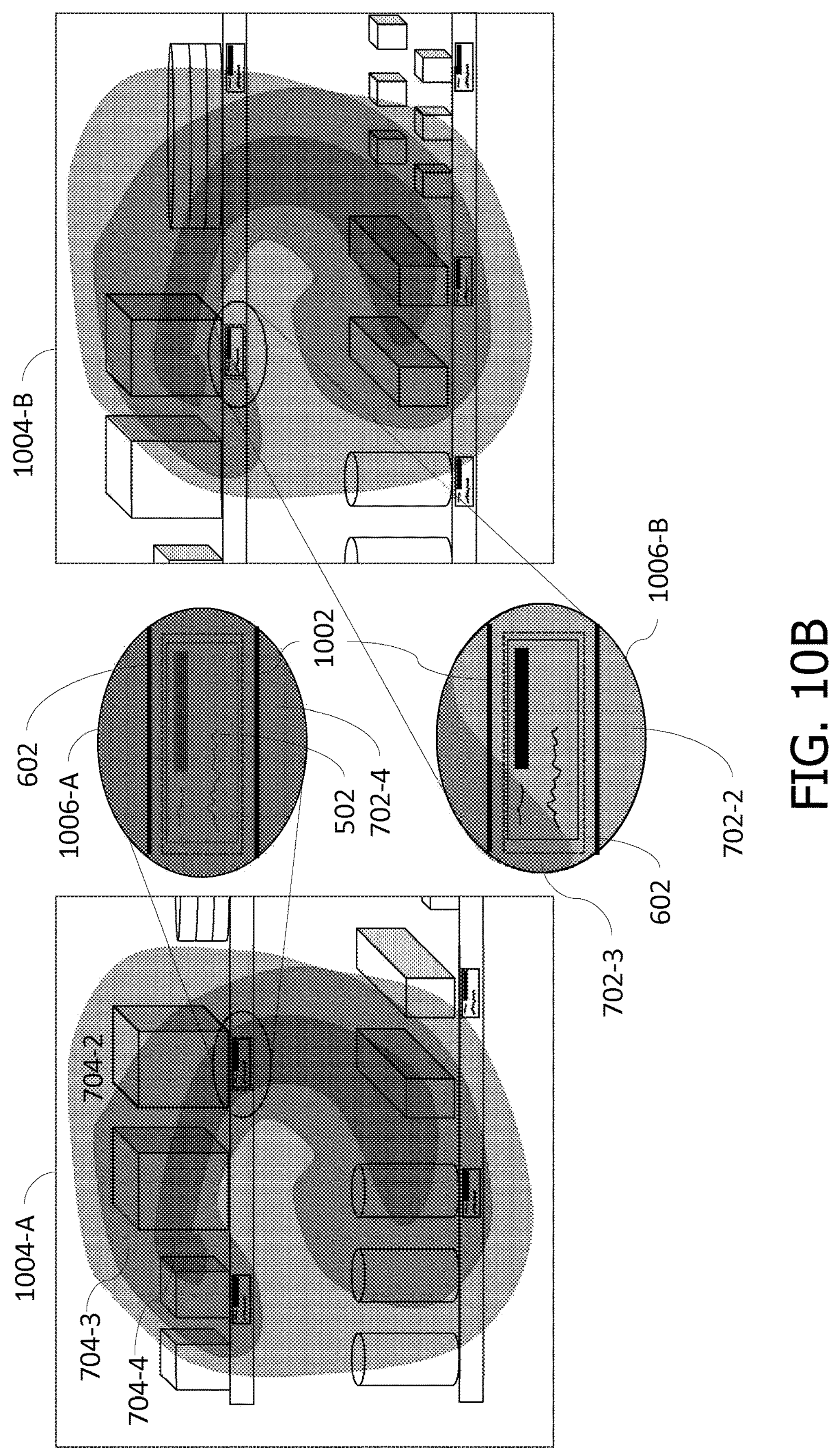
Figure 10C:
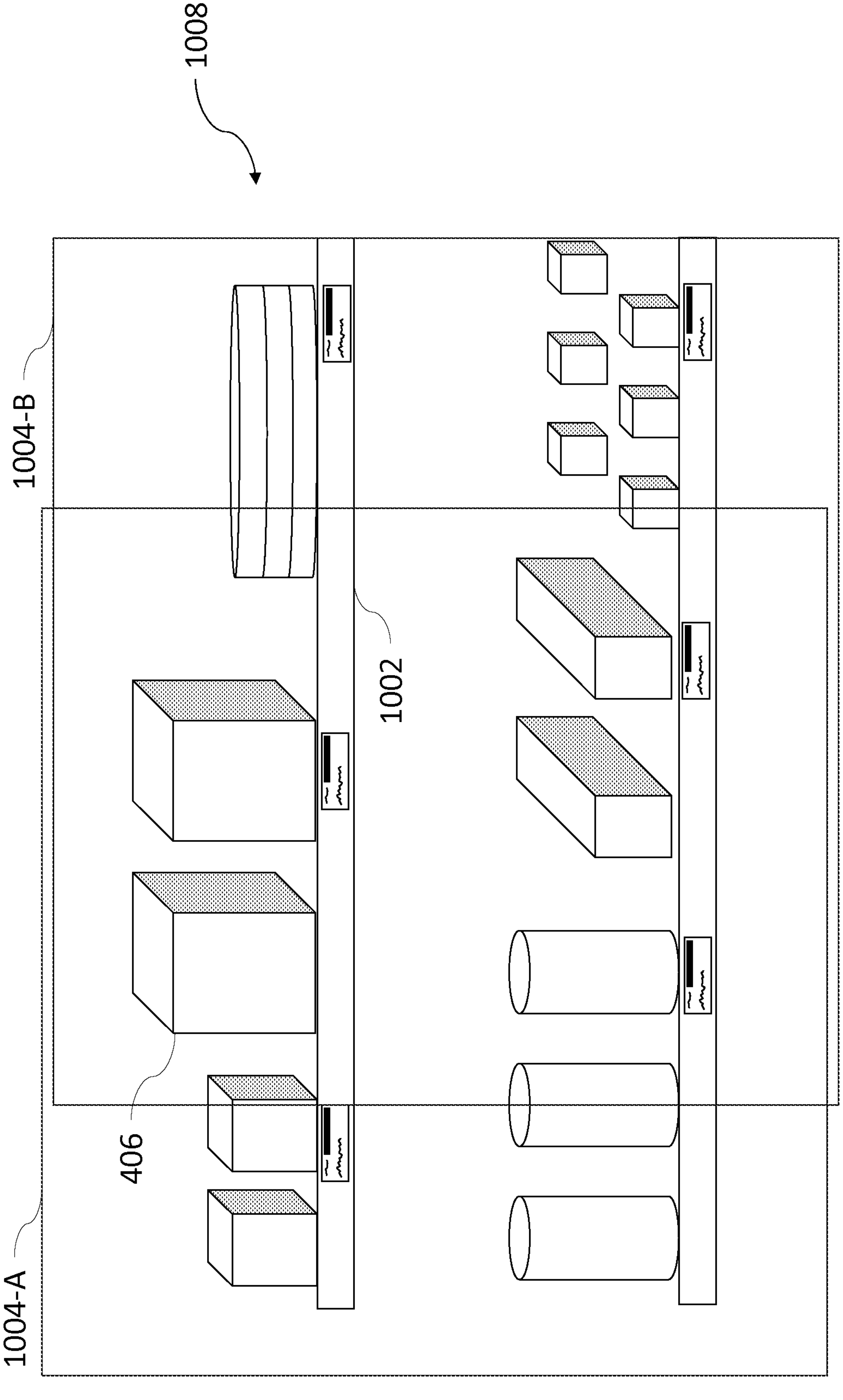

FIG. 10C illustrates the two images 1004-A and 1004-B combined to produce a single panoramic image 1008, according to the exemplary embodiment. Although not shown for clarity, each label 502 depicted also corresponds to a bounding box 602 (shown previously in FIG. 10B) and, within each bounding box, the image resolution is improved using data from multiple images. One can appreciate that regions of the image 1008 outside the bounding box have not been processed to increase resolution. However, the additional constraints provided by the present disclosure also may improve the image-element alignment of the objects 406 to avoid discontinuities or other irregularities common within panoramic imagery. The image 1008 as shown may depict the whole shelf 1002 or a portion thereof. The image 1008 may be combined with third, fourth, and so on images to generate a larger panoramic image. Notably, as shown in FIGS. 10A-C, multiple labels 502 are shown for the shelf 1002. The process described above may be repeated for each of the labels on the shelf unit 1002, generating a plurality of panoramic images, one for each label, with enhanced resolution of the pixels therein. When multiple images of multiple labels are generated, the images may be combined or stitched further to produce an aggregated image wherein each label has enhanced pixel resolution. The panoramic image may end upon (i) the robot 102 reaching the end of the object (i.e., shelf 1002) to be scanned, or (ii) reaching the end of a bin. It may be advantageous for humans to read inventory reports at a per-shelf level or per-bin level, wherein identified features may be listed in categories corresponding to their shelves, displays, bins, etc. for the convenience of the human interpreting the inventory report. In some embodiments, the report may include the panoramic image of the shelf or bin.

Ideally, the robot 102 could image every scannable object only once to meet necessary criteria for feature identification. However, in numerous cases the robot 102 may be required to double-back on a feature, such as to get to another part of the environment to continue scanning. Accordingly, the robot 102 may capture additional images of an already scanned object. It may not be desirable, however, to (i) identify features on the images again, as this costs extra time and computational recourses; or (ii) transmit the duplicate images to a server if feature identification is performed off-robot 102 as this would increase data usage. Accordingly, the robot 102 should only consider adding additional images of already-scanned objects if the new images are of higher quality than prior images. Image quality may be determined via the image quality matrix 702 discussed above, and/or using the methods shown and described in FIG. 11, according to an exemplary embodiment.

Figure 11:
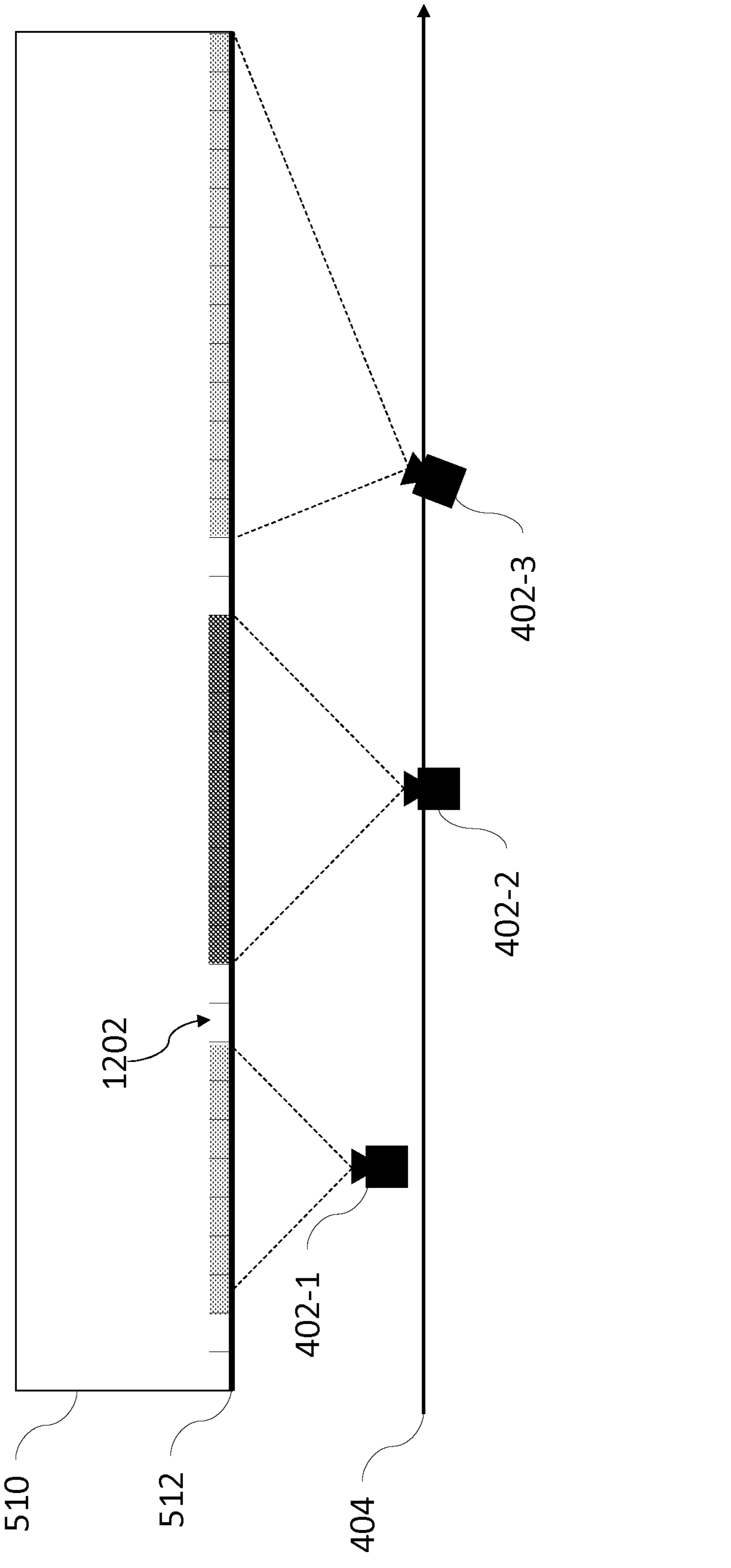
FIG. 11 illustrates an exemplary scoring method for segments of a scannable surface for use in caching redundant images of features, according to an exemplary embodiment.

FIG. 11 illustrates three locations of an imaging camera 402-1, 402-2, and 402-3 capturing images of a scannable surface 512 of an object 510. The scanning segment 404 has been redefined to indicate the ideal location of the camera sensor 402 as opposed to the ideal location of the robot 102, e.g., as shown in FIG. 5 previously, wherein it is appreciated that the transform is merely a fixed and constant change of origins.

The scannable segment 512 of the object 510 can be discretized into a plurality of segments 1102, each comprising a uniform width (e.g., 5 cm). For each image captured by the camera 402, the controller 118 may, using the known field of view of the sensor 402 and distance 514 to the surface 512, determine which segments 1102 were encompassed within each image. Camera position 402-2 is in the ideal location, along the ideal scanning segment 404, and configured at normal incidence to the surface 512. Accordingly, segments 1102 depicted by this camera 402-2 are given a high score, shown by dark shading of the corresponding segments 1102.

Camera position 402-1 is located off the ideal scanning segment 404 and is accordingly assigned a lower score for being at the suboptimal distance to the segment 512. For instance, the robot 102 may have needed to avoid an object and thus deviate from its ideal, straight-line path. Similar penalties can apply if the camera 402 is positioned too far from the surface 512.

Camera position 402-3, while on the ideal scanning segment 404, is at a suboptimal orientation. The orientation of the camera 402-3 should be parallel to the surface normal vector of the surface 512. The camera will image more of the segments 1102, however those segments 1102 are of low quality (relative to camera position 402-2) and are accordingly assigned a low score.

In some instances, both the (x, y) position and orientation of the camera 402 may be utilized to penalize images as lower quality.

If a robot 102 later passes by this object 510, the controller 118 may disregard any new images captured which do not exceed the score of the prior images captured. If, however, the controller 118 captures a new, higher-scoring (i.e., better quality) image than during its prior pass by the object 510, the new image may be stored and used for feature identification. It is appreciated that during later passes of the same object, the images captured may not perfectly align with the prior images captured. However, once features are identified in the image space, the image-space locations can be translated into physical-space locations along surface 512, wherein tracking which segments 1102 were imaged in each image may alleviate double counting/missed features.

Tracking of which segments 1102 are encompassed within the field of view of the camera may also be leveraged to ensure sequential images captured do not include substantial overlap, as this would (i) massively increase the amount of data collected, transmitted, and processed; and (ii) be largely redundant. Multiple overlapping images may still be processed for improving resolution of labels 502, however beyond improving readability of the labels 502 the added data transmission and processing may supersede the marginal improvements to feature identification using redundant imagery. For instance, the percent of tolerable overlap can be a tunable parameter based on the number of segments 1102 allowed to be in one image and its subsequent image. Tracking of which segments 1102 were sensed/imaged may provide a tunable parameter of percentage overlap between sequential images, wherein a robot operator may increase the overlap for more robust feature identification or decrease the overlap to save on data and processing costs.

According to at least one non-limiting exemplary embodiment, any of the image quality measurements described herein may be utilized to filter poor quality images from transmission and/or processing for feature identification. For instance, image quality matrix may be utilized in conjunction with the position-based scoring described in FIG. 12 to determine a "best" quality image of a certain segment of surface 512 or may be utilized to exclude images if they do not meet a threshold level of quality/score.

According to at least one non-limiting exemplary embodiment, the robot 102 may serve as source for collection of data, wherein any processing of the data collected (e.g., images) may be performed on a computing device separate from the robot 102, such as server 202. In order to enable the feature identification on the separate computing entity, the controller 118 of the robot 102 must also communicate (i) computer readable map data, and (ii) odometry data corresponding to the locations where the images are acquired. One skilled in the art may appreciate that the amount of processing performed on the robot 102 versus another entity such as a server 202 may depend on (i) the size of the images in bites, (ii) the communications network (e.g., LTE/cellular versus Wi-Fi), (iii) the precision of the feature identification (e.g., identifying products on a shelf or identifying specific text of those products on the shelf), and (iv) cost (e.g., for LTE usage or cloud server computing and storage cost).

According to at least one non-limiting exemplary embodiment, the plurality of object continuity preservation methods described herein (e.g., FIG. 6A-C or FIG. 12) may enable a robot 102 and/or server 202 system to perform feature identification on the raw images captured by the robot even if those images include substantial overlap, wherein object continuity analysis can be implemented after feature identification to ensure features are not duplicated or skipped.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "notably," "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A robotic system, comprising:

a memory comprising computer readable instructions stored thereon; and a processor configured to execute the computer readable instructions to:

receive, via a sensor coupled to the robotic system, a first image of an object and a second image of the object as the robotic system moves along a route, wherein the route comprises one or more scanning segments that extend parallel to surfaces of corresponding objects to be imaged;

determine, via a computer readable map, distance to the object within the first and second images and horizontal translation of the robotic system between the first and second image, wherein the horizontal translation of the robotic system on the computer readable map is determined based on odometry data of the robotic system, wherein the distance to the object is based on a pre-determined distance of the one or more scanning segments to the surfaces of the corresponding objects to be imaged;

determine a bounding box for each price label depicted in the first and second images;

determine an image quality matrix based on a level of contrast detected within the bounding boxes corresponding to the price labels within the first and second images, wherein the contrast is detected based on color transitions between adjacent pixels within the bounding boxes;

align the first and second images to form a panoramic image at least in part based on locations of the bounding boxes and the horizontal translation of the robotic system, such that price labels of the object are neither duplicated nor omitted in the panoramic image, and the panoramic image begins and ends proximate to edges of the object on the computer readable map; and communicate the panoramic image to a server.

2. The robotic system of claim 1, wherein, the object comprises a plurality of labels including the price labels, and wherein each of the plurality of labels correspond to a feature of the object, the plurality of labels comprise at least one of a text or computer readable code element.

3. The robotic system of claim 2, wherein the processor is further configured to execute the computer readable instructions to:

determine via optical character recognition (OCR) a bounding box for each label of the plurality of labels depicted in the first and second images; and perform the alignment at least in part based on locations of the bounding boxes of the plurality of labels.

4. The robotic system of claim 3, wherein the processor is further configured to execute the computer readable instructions to, determine an image quality matrix based on level of contrast detected within bounding boxes of the plurality of labels within a plurality of images; and during panoramic image construction, bias color values of pixels in the panoramic image towards high-quality pixels denoted in the image quality matrix.

5. The robotic system of claim 4, wherein the processor is further configured to execute the computer readable instructions to, adjust color values of pixels depicting the label within the bounding box of either the first image or the second image based on the color values of the label in the first and second images and the image quality matrix.

6. The robotic system of claim 1, wherein, the computer readable map includes bin-level annotations for the object to be scanned, wherein the annotations identify a surface of the object, a distance to the surface, and edges of the object defining a start and an end of the one or more scanning segments.

7. A method for forming an image by a robotic system, comprising:

receiving, via a sensor coupled to the robotic system, a first image of an object and a second image of the object as the robotic system moves along a route, wherein the route comprises one or more scanning segments that extend parallel to surfaces of corresponding objects to be imaged;

determining, via a computer readable map, distance to the object within the first and second images and horizontal translation of the robotic system between the first and second image, wherein the horizontal translation of the robotic system on the computer readable map is determined based on odometry data of the robotic system, wherein the distance to the object is based on a pre-determined distance of the one or more scanning segments to the surfaces of the corresponding objects to be imaged;

determining a bounding box for each price label depicted in the first and second images;

determining an image quality matrix based on a level of contrast detected within the bounding boxes corresponding to the price labels within the first and second images, wherein the contrast is detected based on color transitions between adjacent pixels within the bounding boxes;

aligning the first and second images to form a panoramic image at least in part based on locations of the bounding boxes and the horizontal translation of the robotic system, such that price labels of the object are neither duplicated nor omitted in the panoramic image, and the panoramic image begins and ends proximate to edges of the object on the computer readable map; and communicating the panoramic image to a server.

8. The method of claim 7, wherein, the object comprises a plurality of labels including the price labels, and wherein each of the plurality of labels correspond to a feature of the object, the plurality of labels comprise at least one of a text or computer readable code element.

9. The method of claim 8, further comprising:

determining via optical character recognition (OCR) a bounding box for each label of the plurality of labels depicted in the first and second images; and performing the alignment at least in part based on locations of the bounding boxes of the plurality of labels.

10. The method of claim 9, further comprising:

determining an image quality matrix based on level of contrast detected within bounding boxes of the plurality of labels within a plurality of images; and during panoramic image construction, bias color values of pixels in the panoramic image towards high-quality pixels denoted in the image quality matrix.

11. The method of claim 10, further comprising:

adjusting color values of pixels depicting the label within the bounding box of either the first image or the second image based on the color values of the label in the first and second images and the image quality matrix.

12. The method of claim 7, wherein, the computer readable map includes bin-level annotations for the object to be scanned, wherein the annotations identify a surface of the object, a distance to the surface, and edges of the object defining a start and an end of the one or more scanning segments.

13. A non-transitory computer readable medium comprising computer readable instructions stored there that when executed by at least one processor configure the at least one processor to, receive, via a sensor coupled to a robotic system, a first image of an object and a second image of the object as the robotic system moves along a route, wherein the route comprises one or more scanning segments that extend parallel to surfaces of corresponding objects to be imaged;

determine, via a computer readable map, a distance to the object within the first and second images and horizontal translation of the robotic system between the first and second image, wherein the horizontal translation of the robotic system on the computer readable map is determined based on odometry data of the robotic system, wherein the distance to the object is based on a predetermined distance of the one or more scanning segments to the surfaces of the corresponding objects to be imaged;

determine a bounding box for each price label depicted in the first and second images;

determine an image quality matrix based on a level of contrast detected within the bounding boxes corresponding to the price labels within the first and second images, wherein the contrast is detected based on color transitions between adjacent pixels within the bounding boxes:

align the first and second images to form a panoramic image at least in part based on locations of the bounding boxes and the horizontal translation of the robotic system, such that price labels of the object are neither duplicated nor omitted in the panoramic image, and the panoramic image begins and ends proximate to edges of the object on the computer readable map; and communicate the panoramic image to a server.

14. The non-transitory computer readable medium of claim 13, wherein the object comprises a plurality of labels including the price labels, and wherein each of the plurality of labels correspond to a feature of the object, the plurality of labels comprise at least one of a text or computer readable code element.

15. The non-transitory computer readable medium of claim 14, wherein the at least one processor is further configured to execute the computer readable instructions to, determine via optical character recognition (OCR) a bounding box for each label of the plurality of labels depicted in the first and second images; and perform the alignment at least in part based on locations of the bounding boxes of the plurality of labels.

16. The non-transitory computer readable medium of claim 15, wherein the at least one processor is further configured to execute the computer readable instructions to, determine an image quality matrix based on level of contrast detected within bounding boxes of the plurality of labels within a plurality of images; and during panoramic image construction, bias color values of pixels in the panoramic image towards high-quality pixels denoted in the image quality matrix.

17. The non-transitory computer readable medium of claim 16, wherein the at least one processor is further configured to execute the computer readable instructions to, adjust color values of pixels depicting the label within the bounding box of tither the first image or the second image based on the color values of the label in the first and second images and the image quality matrix.

18. The non-transitory computer readable medium of claim 13, wherein, the computer readable map includes bin-level annotations for the object to be scanned, wherein the annotations identify a surface of the object, a distance to the surface, and edges of the object defining a start and an end of the one or more scanning segments.

19. The robotic system of claim 1, wherein the odometry data represents physical movement of the robotic system along the route.

20. The robotic system of claim 1, wherein the first and second images are aligned to form the panoramic image such that features of the object are neither duplicated nor omitted in the panoramic image.

* * * * *